(12) United States Patent
Zheng et al.

(10) Patent No.: US 9,936,454 B2
(45) Date of Patent: Apr. 3, 2018

(54) STATIONS, ACCESS POINTS, COMMUNICATION SYSTEMS AND METHODS OF CONTROLLING THE SAME

(71) Applicant: Agency for Science, Technology and Research, Singapore (SG)

(72) Inventors: Shoukang Zheng, Singapore (SG); Haiguang Wang, Singapore (SG); Zhongding Lei, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/384,535

(22) PCT Filed: Mar. 12, 2013

(86) PCT No.: PCT/SG2013/000100
§ 371 (c)(1),
(2) Date: Sep. 11, 2014

(87) PCT Pub. No.: WO2013/137824
PCT Pub. Date: Sep. 19, 2013

(65) Prior Publication Data
US 2015/0029922 A1    Jan. 29, 2015

(30) Foreign Application Priority Data

Mar. 12, 2012 (SG) .................................. 201201750
May 11, 2012 (SG) .................................. 201203475
(Continued)

(51) Int. Cl.
*H04W 52/02* (2009.01)

(52) U.S. Cl.
CPC ... *H04W 52/0225* (2013.01); *H04W 52/0216* (2013.01); *H04W 52/0274* (2013.01); *Y02B 60/50* (2013.01)

(58) Field of Classification Search
CPC .................................................. H04W 52/0225
See application file for complete search history.

(56) References Cited

U.S. PATENT DOCUMENTS

2005/0096101 A1* 5/2005 Sayers ................ H04B 1/1615
455/574
2007/0147423 A1 6/2007 Wentink
(Continued)

OTHER PUBLICATIONS

IEEE Computer Society, IEEE Standard for Information Technology—Telecommunications and Information Exchange Between Systems—Local and Metropolitan Area Networks—Specific Requirements, IEEE Std 802.11-2007 (IEEE 2007).
(Continued)

*Primary Examiner* — Brian D Nguyen
(74) *Attorney, Agent, or Firm* — K. David Crockett, Esq.; Niky Economy Syrengelas, Esq.; Crockett & Crockett, PC

(57) ABSTRACT

In various embodiments, a method of controlling a station may be provided. The method may include receiving a first signal from an access point, the first signal including information indicating a time period. The method may further include deactivating the station after receiving the first signal and before expiry of the time period. The method may also include activating the station upon expiry of the time period.

22 Claims, 27 Drawing Sheets

(30) Foreign Application Priority Data

Sep. 12, 2012 (SG) .................................. 201206797
Oct. 15, 2012 (SG) .................................. 201207676

(56) References Cited

U.S. PATENT DOCUMENTS

| | | | |
|---|---|---|---|
| 2007/0159992 A1* | 7/2007 | Kim .................. | H04W 52/0216 370/311 |
| 2008/0225768 A1* | 9/2008 | Wentink ............ | H04W 52/0216 370/311 |
| 2010/0062725 A1* | 3/2010 | Ryu .................. | H04W 52/0251 455/69 |
| 2010/0246460 A1* | 9/2010 | Kholaif ............. | H04W 52/0216 370/311 |
| 2010/0265864 A1* | 10/2010 | He ..................... | H04W 68/025 370/311 |
| 2010/0315979 A1 | 12/2010 | Surineni et al. | |

OTHER PUBLICATIONS

Written Opinion dated Apr. 30, 2015 from Singapore Application 11201405640W.
Sesia, et al., LTE—The UMTS Long Term Evolution: From Theory to Practice, John Wiley & Sons (Jul. 20, 2011).
Written Opinion dated Jan. 12, 2015 from Singapore Application 11201405640W.

\* cited by examiner

PRIOR ART

| Bits 0-13 | Bit 14 | Bit 15 | Usage |
|---|---|---|---|
| 0-32 767 | 0-32 767 | 0 | Duration value (in microseconds) within all frames other than PS-Poll frames transmitted during the CP, and under HCF for frames transmitted during the CFP |
| 0 | 0 | 1 | Fixed value under point coordination function (PCF) within frames transmitted during the CFP |
| 1-16 383 | 0 | 1 | Reserved — 240 |
| 0 | 1 | 1 | Reserved — 242 |
| 1-2007 | 1 | 1 | AID in PS-Poll frames |
| 2008-16 383 | 1 | 1 | Reserved — 244 |

STATIONS, ACCESS POINTS, COMMUNICATION SYSTEMS AND METHODS OF CONTROLLING THE SAME

CROSS-REFERENCE TO RELATED APPLICATIONS

This application claims the benefit of priority of SG application No. 201201750-5 filed Mar. 12, 2012, SG application No. 201203475-7 filed May 11, 2012, SG application No. 201206797-1 filed Sep. 12, 2012 as well as SG application No. 201207676-6, filed Oct. 15, 2012, the contents of them being hereby incorporated by reference in their entirety for all purposes.

TECHNICAL FIELD

Various aspects of this disclosure relate to stations, access points, communication systems and methods of controlling the same.

BACKGROUND

The Institute of Electrical and Electronics Engineers (IEEE) 802.11 standards define a family of protocols for implementing Wireless Local Area Networks (WLAN). The communication range is up to a few hundred meters and usually is about two to three hundred meters. The standards is created and maintained by IEEE Local Area Network/Metropolitan Area Network (LAN/MAN) Standard Committee (IEEE 802). The standards are used in various scenarios such as networks for home/offices, factories, and cellular communications.

The IEEE 802.11 standard is designed as communication protocols for Wireless Local Area Networks (WLAN). Usually, an access point (AP) works with a few to a few tens of stations (STAs) associated to it and within a range of a few hundred meters. The current standard can easily handle such a small scale of networks.

However, with new application scenarios for WLAN, such as Smart Grids for power networks, an AP may required to extend its coverage to 1 km, and handle a few thousands of nodes (up to 6000 as required by the 801.11 ah standard amendment requirements) with low transmission speed. Several problems, including power savings for the stations may arise if the current 802.11 standard is used.

IEEE802.11-12/0114r0 notes that battery powered devices may limit power consumption by limiting the active/awake/receive time. Devices consume power when listening for beacons with traffic indication map (TIM) frames.

A device with a long doze period may be required to wake up early due to clock drift during the long doze period. Also, a beacon with a TIM frame may require several milliseconds to complete transmission. These may increase duration in which the station is active/awake.

IEEE802.11-12/0114r0 proposes using an immediate power save (PS)-Poll protocol to limit power consumption. FIG. 1A is a schematic 100a showing the immediate PS-Poll protocol of an access point (AP) 102a and a station (STA) 104a, in which buffered data (or buffered units) 106 for the station (STA) 104a is pending in the access point 102a. FIG. 1B is a schematic 100b showing the immediate PS-Poll protocol of an access point (AP) 102b and a station (STA) 104b, in which no buffered data (or buffered units) 106 for the station (STA) 104b is pending in the access point 102a. The STA 104a, 104b is in doze state 108a, 108b, 108c, 108d most of the time, during which the STA 104a, 104b may not check for beacon signals with TIM frames 110. The STA 104a, 104b may also not be synchronized with the Time Synchronization Function (TSF). The STA 104a, 104b may wake up at the desired time 112a, 112b and sends a PS-Poll 114a, 114b to the AP. At this juncture, the STA 112a, 112b may not yet know if there is buffered data (or buffered units (BU)) 106 pending for it at the AP 102a, 102b for the STA 112a, 112b as it does not check for beacon signals with TIM frames previously. If there is buffered data (or buffered units (BU)) 106 pending, the AP 102a may respond immediately by either transmitting the buffered data (or buffered units) 106 or by sending an acknowledgement (ACK) frame 116a indicating there is buffered data (or buffered units) 106 in the AP 102 for the STA 104a (BU=1). If there is no buffered data (or buffered units) 106 pending in the AP 102b for the STA 104b, there may be an ACK frame 116b setting BU to be 0. The STA 104b may go to sleep if there is no buffered data (or buffered units) 106 pending in the AP 102b for the STA 104b.

However, allowing the STAs to send PS-Poll signals anytime after wakeup may make contention worse if a large number of STAs wake up at almost the same time to contend on channel access. The STAs may have to wait for completion of other transmissions due to competing PS-Polls from multiple STAs. Also, the overall transmission time spent to receive individual ACK frames for a large number of STAs may be long. Power consumption for awaiting STAs may be high due to low data rate even with the immediate PS-Poll mechanism. In addition, multiple STAs may have to send the PS-Poll signals within a relatively short period of time even only when a few STAs may need to receive buffered data from the AP. Furthermore, a target beacon transmission time (TBTT) may be just shortly after a STA sends the PS-Poll, which may result in unnecessary duplication.

SUMMARY

In various embodiments, a method of controlling a station may be provided. The method may include receiving a first signal from an access point, the first signal including information indicating a time period. The method may further include deactivating the station after receiving the first signal and before expiry of the time period. The method may also include activating the station upon expiry of the time period.

In various embodiments, a method of controlling an access point may be provided. The method may include determining a time period. The method may further include transmitting a first signal to a station, the first signal comprising information indicating the time period. The method may also include processing a second signal upon expiry of the time period.

In various embodiments, a method of communication between an access point and a plurality of stations may be provided. The method may include transmitting a first signal from an access point to a plurality of stations, the first signal including information indicating a time period. The method may further include deactivating the plurality of stations after the plurality of stations receives the first signal but before expiry of the time period. The method may also include activating the plurality of stations upon expiry of the time period.

In various embodiments, a station may be provided. The station may include a receiving circuit configured to receive a first signal from an access point, the first signal comprising information indicating a time period. The station may also include a deactivation circuit configured to deactivate the station after receiving the first signal and before expiry of the time period. The station may further include an activation circuit configured to activate the station upon expiry of the time period.

In various embodiments, an access point may be provided. The access point may include a transmitting circuit configured to transmit a first signal to a station, the first signal including information indicating a time period. The access point may further include a further circuit configured to process a second signal upon expiry of the time period.

In various embodiments, a communication system may be provided. The communication system may include an access point and a plurality of stations. The access point may be configured to transmit a first signal to the plurality of stations, the first signal including information indicating a time period. The plurality of stations may be configured to be deactivated after the plurality of stations receives the first signal but before expiry of the time period. The plurality of stations may be configured to be activated upon expiry of the time period.

BRIEF DESCRIPTION OF THE DRAWINGS

The invention will be better understood with reference to the detailed description when considered in conjunction with the non-limiting examples and the accompanying drawings, in which:

FIG. 2D is a table showing the usage of different bits in the duration field.

DETAILED DESCRIPTION

Figure 1A:
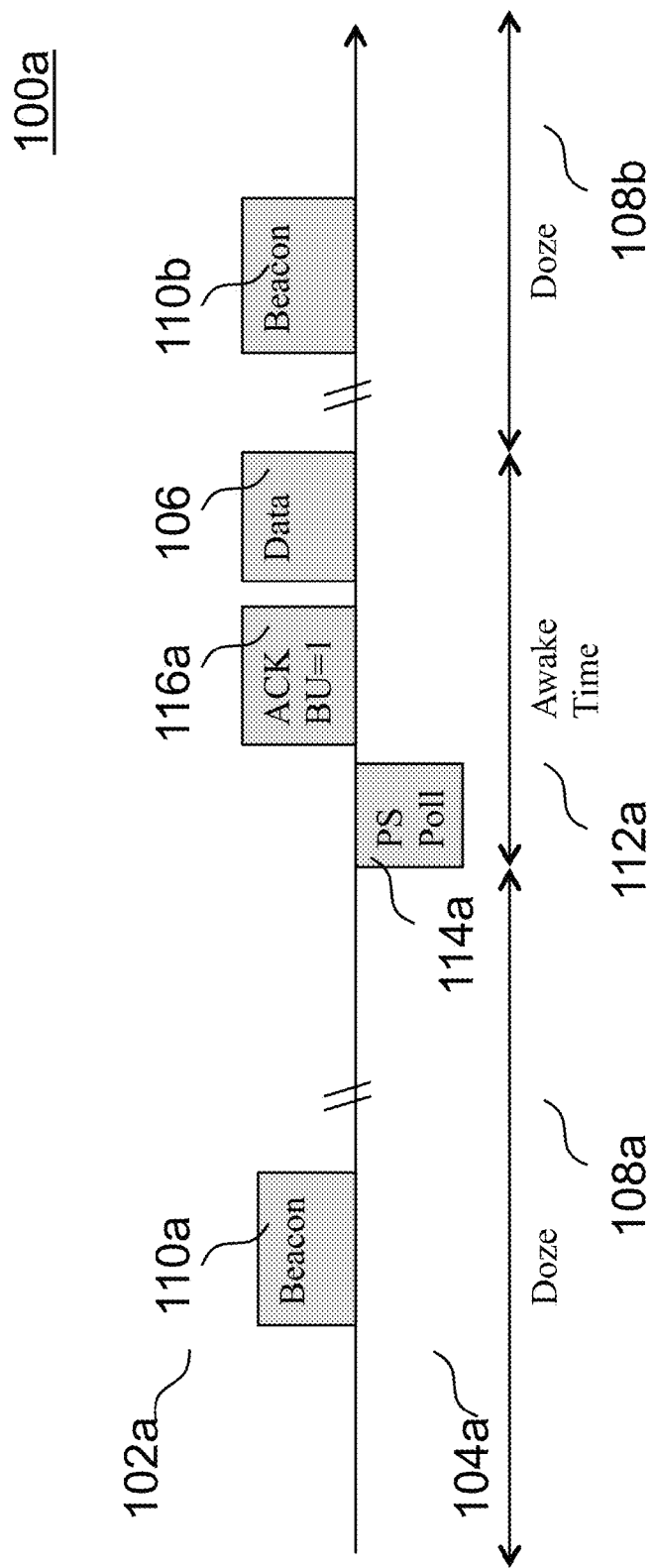
FIG. 1A is a schematic showing the immediate Power Save-Poll (PS-Poll) protocol of an access point (AP) and a station (STA), in which buffered data (or buffered units) for the station (STA) is pending in the access point.
Figure 1B:
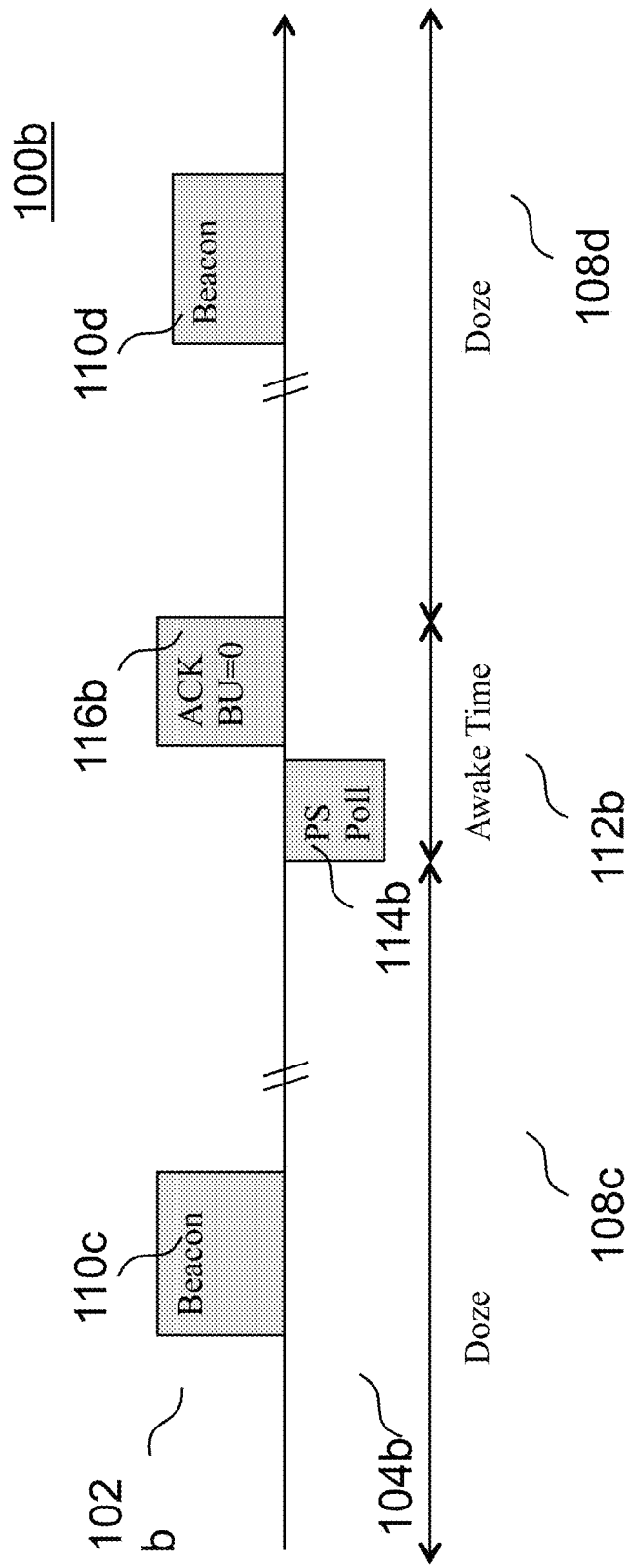
FIG. 1B is a schematic showing the immediate Power Save-Poll (PS-Poll) protocol of an access point (AP) and a station (STA), in which no buffered data (or buffered units) for the station (STA) is pending in the access point.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Under IEEE Standard 802.11 for Information Technology—Telecommunications and Information Exchange between Systems—Local and Metropolitan Area Networks—Specific Requirements Part 11: Wireless LAN Medium Access Control (MAC) and Physical Layer (PHY) Specifications, a station (STA) is defined as any device that contains an IEEE 802.11—conformant medium access control (MAC) and physical layer (PHY) interface to the wireless medium (WM).

According to various embodiments, a station may be a component or device or means capable for transmitting and receiving information via wireless means. According to various embodiments, a station includes, but is not limited to a station as defined in IEEE Standard 802.11. Unless otherwise explicitly stated, references to stations usually refer to non-access point (non-AP) stations.

In various embodiments, a station may be a mobile device such as mobile phone or a laptop with a wireless interface controller. In various embodiments, the station may be a desktop computer with a wireless interface controller.

Under IEEE Standard 802.11 for Information Technology—Telecommunications and Information Exchange between Systems—Local and Metropolitan Area Networks—Specific Requirements Part 11: Wireless LAN Medium Access Control (MAC) and Physical Layer (PHY) Specifications, an access point is defined as any entity that has station (STA) functionality and provides access to distribution services, via the wireless medium (WM) for associated stations (STAs).

According to various embodiments, an access point may be a component or device or means that provides access between associated stations to other communication systems, devices or components via wireless means between the associated stations and the access point. According to various embodiments, an access point includes, but is not limited to an access point as defined under the IEEE Standard 802.11.

In various embodiments, an access point may be a device that allows wireless devices to connect to a wired network using Wi-Fi or related standards. In various embodiments, the access point may be connected to a router via a wired network or may be part of a router itself. The router may provide communication with external networks. In various embodiments, an AP may be a hotspot. In various embodiments, an AP may be incorporated in a battery-powered router or smartphone. The battery-powered router or smartphone may also include a cellular mobile Internet radio modem. When subscribed to a cellular phone carrier, the battery-powered router or smartphone allows nearby Wi-Fi stations to access the Internet through cellular networks such as 2G, 3G or 4G networks.

Under IEEE Standard 802.11 for Information Technology—Telecommunications and Information Exchange between Systems—Local and Metropolitan Area Networks—Specific Requirements Part 11: Wireless LAN Medium Access Control (MAC) and Physical Layer (PHY) Specifications, authentication refers to a service used to establish the identity of one station (STA) as a member of the set of STAs authorized to associate via another STA. According to various embodiments, authentication refers to a service used to establish of one station as a member of the set of non-AP stations authorized to associate via an AP, and includes, but is not limited to authentication as defined under the IEEE Standard 802.11.

Under IEEE Standard 802.11 for Information Technology—Telecommunications and Information Exchange between Systems—Local and Metropolitan Area Networks—Specific Requirements Part 11: Wireless LAN Medium Access Control (MAC) and Physical Layer (PHY) Specifications, association refers to a service used to establish access point/station (AP/STA) and enable STA invocation of the distribution system services (DSSs). According to various embodiments, association refers to a service used to establish access between an AP and a non-AP station and includes, but is not limited to association as defined under the IEEE Standard 802.11.

In various embodiments, a STA in asleep mode may refer to the STA in a power save mode. A STA in asleep mode may also be referred to be as in an inactive mode or in a doze mode. When a STA is in asleep mode, it may not transmit signals to another device such as an AP. However, a STA may include components or circuit which remain active when the STA is in an asleep mode, such as a watchdog circuit or a clock circuit. In various embodiments, a STA in awake mode may refer to the STA in an active mode or in a wake mode. When a STA is in awake mode, it may transmit signals to or receive signals from another device such as an AP.

In various embodiments, activating a STA may include changing the STA from an asleep mode to an awake mode. Corresponding meanings may apply to the terms "activate", "activated" and "activation".

In various embodiments, deactivating a STA may include changing the STA from an awake mode to an asleep mode. Corresponding meanings may apply to the terms "deactivate". "deactivated" and "deactivation".

Various embodiments relates to wireless communications. An access point may include an access point for wireless communication. A station may include a station for wireless communication. Transmitting or sending a signal may include transmitting or sending the signal via wireless means. Receiving a signal may include receiving the signal via wireless means.

In various embodiments, a "circuit" may be understood as any kind of a logic implementing entity, which may be special purpose circuitry or a processor executing software stored in a memory, firmware, or any combination thereof. Thus, in various embodiments, a "circuit" may be a hardwired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with alternative embodiments.

Various aspects of this disclosure provide a method and system that may be able to address at least partially some of the abovementioned issues.

Figure 2A:
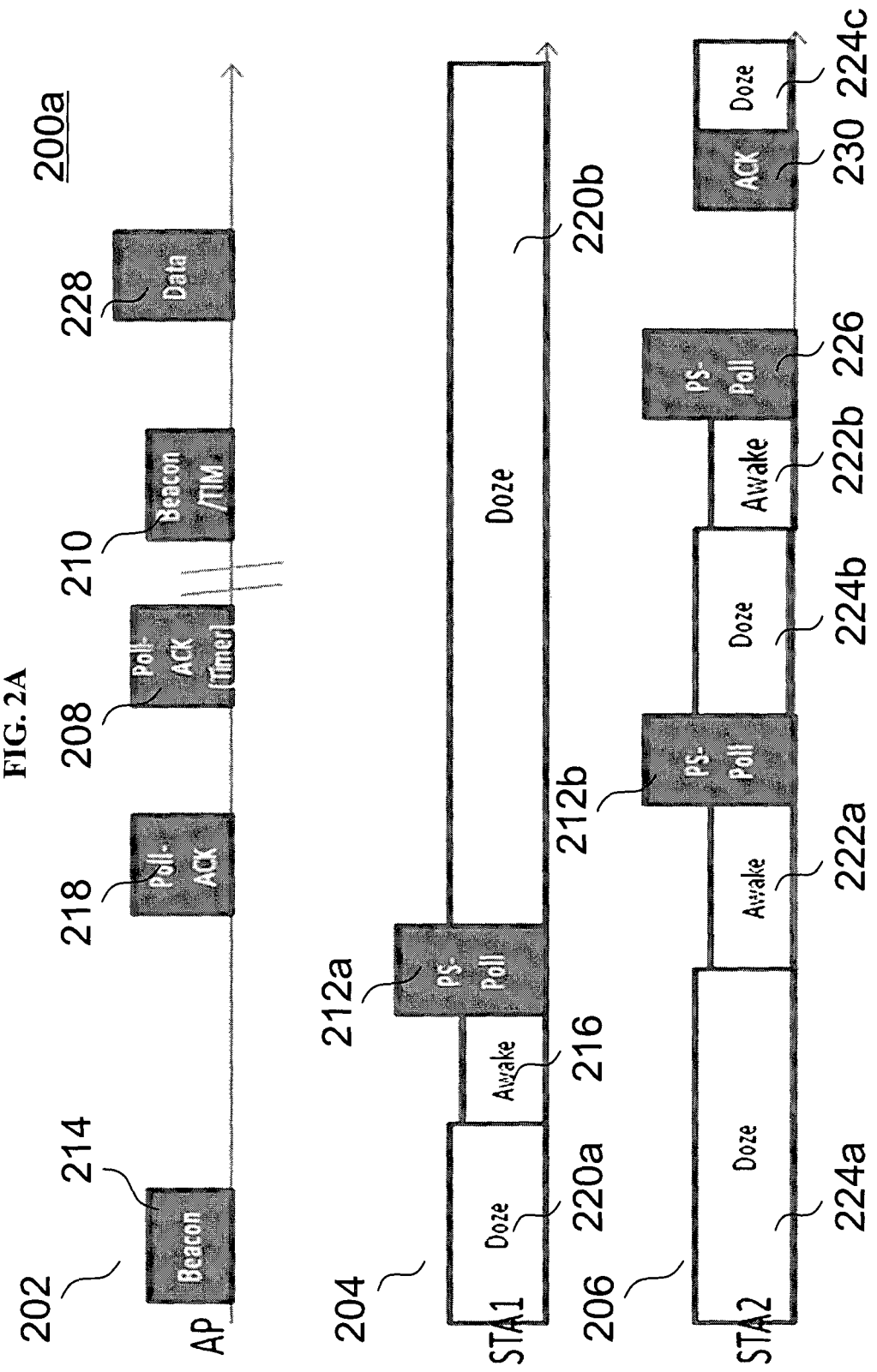
FIG. 2A is a schematic showing a method of communication between an access point (AP) and a first station (STA1) according to various embodiments and a method of communication between the access point (AP) and a second station (STA2) according to various embodiments.

FIG. 2A is a schematic 200*a* showing a method of communication between an access point (AP) 202 and a first station (STA1) 204 according to various embodiments and a method of communication between the access point (AP) 202 and a second station (STA2) 206 according to various embodiments. FIG. 2A also shows a method of controlling a station 204, 206 according to various embodiments and a method of controlling an access point 202 according to various embodiments.

A method of controlling a station (STA) (e.g. STA2 206) may be provided. The method may include receiving a first signal 208 from an access point (AP) 202, the first signal including information indicating a time period. The method may further include deactivating the station STA2 206 after receiving the first signal 208 and before expiry of the time period. The method may also include activating the station STA2 206 upon expiry of the time period.

References to a time period may include references to a timer. The time period may include a time duration starting with a start time and ending with an end time.

The end time may include a Target Beacon Transmission Time (TBTT) or Target Traffic Indication Map (TIM) Segment Transmission Time (TTSTT) or Target Traffic Indication Map (TIM) Transmission Time (TTTT).

Target Beacon Transmission Time (TBTT) may refer to the time by which the AP must send a beacon signal. Target TIM Segment Transmission Time (TTSTT) may refer to the time by which a target TIM segment to a STA must be transmitted by the AP. TTSTT may be provided in beacon intervals (long or short) or time units (TUs). If all the TIM segments are fitted into one TIM frame, TTSTT may be TBTT. Target TIM Transmission Time (TTTT) may refer to the time by which the AP must send a TIM signal.

The TBTT or TTSTT or TTTT may be the time in which the first bit of information in the second signal is transmitted to the local physical (PHY) layer and from the PHY layer to the Medium Access (MAC) sub layer of the Data Link layer and from the MAC sublayer to the interface with the wireless medium (e.g. antenna, light emitting diode (LED) emission surface).

The start time may be or may include a time in which the first bit of information in the first signal is transmitted to the local physical (PHY) layer and from the PHY layer to the Medium Access (MAC) sub layer of the Data Link layer and from the MAC sublayer to the interface with the wireless medium (e.g. antenna, light emitting diode (LED) emission surface). The time may be according to the station's timing synchronization function (TSF).

As shown in FIG. 2A, the AP 202 may transmit signals such as 214 and 210 at regular intervals. In other words, the AP 202 may transmit a prescheduled series of periodic signals such as 202 and 210. The second signal 210 may be one signal of a prescheduled series of periodic signals 210, 214. The signals may be beacon signals or short beacon signals. The signals may include TIM or TIM segments. TIM segments or TIM may be encoded using the encoding methods specified in IEEE standard 802.11-2007 or 802.11v or any other encoding methods.

The station STA1 204 may transmit a prior polling signal 212*a*. STA1 204 may in an awake mode 216 to transmit the prior polling signal 212*a*. The STA1 204 may need to do carrier-sensing on the channel and perform backoff procedure or other unspecified activity before sending the prior polling signal 212*a*. The station STA1 204 may be in an asleep mode or doze mode 220*a* before being activated. The AP 202 may receive the prior polling signal 212*a*. The AP 202 may further determine whether to transmit the first signal 208 to the station STA1 204, the first signal including information indicating a time period. The AP 202 may make the determination by checking whether there is buffered data in the AP 202 for the station STA1 204. The AP 202 may, on checking that there is no buffered data in the AP 202 for STA1 204, send an acknowledgement signal (Poll-ACK) 218 without indicating a time period for activating the station STA1 204. The acknowledgement signal 218 may inform the station STA1 204 that there is no buffered data in the AP 202 for the station STA1 204. The station STA1 204 may be in the active mode 216 to receive the acknowledgement signal 218. The station STA1 204 may then change to asleep mode or doze mode 220*b*. It may also be envisioned that the acknowledgement signal (Poll-ACK) 218 may also be a first signal 208 including information indicating a time period. The station STA1 204 may be deactivated after receiving the first signal 208 but before expiry of the time period. The station STA1 204 may then be activated upon expiry of the time period. The station STA1 204 may be activated to send another polling signal and/or to receive a signal containing TIM or TIM segment.

The station STA2 206 may transmit a prior polling signal 212*b*. STA1 204 may in an awake mode 222*a* to transmit the prior polling signal 212*b*. The STA2 206 may need to do carrier-sensing on the channel and perform backoff procedure or other unspecified activity before sending the prior polling signal 212*b*. The station STA2 206 may be in an asleep mode or doze mode 224*a* before being activated. The AP 202 may receive the prior polling signal 212*b* transmitted from the station STA2 206. The AP 202 may further determine whether to transmit the first signal 208 to the station STA2 206, the first signal 208 including information indicating a time period. The AP 202 may make the determination by checking whether there is buffered data in the AP 202 for the station STA2 206. The AP 202 may determine that there is buffered data in the AP 202 for the station STA2 206. The AP 202 may determine the time period. The AP 202 may transmit a first signal (Poll-ACK[Timer]) 208 to the station STA2 206, the first signal 208 including information indicating a time period. The station STA2 206 may be in the active mode 222*a* to receive the first signal 208.

Alternatively, the first signal 208 may include an indication whether there is buffered data stored in the AP 202 for the station STA2 206. When the first signal 208 includes the indication that there is buffered data stored in the AP 202 for the station STA2 206, the first signal 208 may also include information indicating the time period. When the first signal 208 includes the indication that there is no buffered data stored in the AP 202 for the station 206, the first signal 208 may not include information indicating the time period.

The AP 202 may process the second signal 210 upon expiry of the time period. Processing the second signal may include transmitting the second signal to the station STA 206. The station STA2 206 may receive a first signal (Poll-ACK[Timer]) 208 from the AP 202, the first signal 208 including information indicating a time period. The STA2 206 may be activated upon expiry of the time period to receive the second signal 210. The station STA2 206 may switch from an asleep mode or doze mode 224*b* to an awake mode 222*b*. Alternatively, the station STA2 206 may after receiving the first signal 208 remain in an awake mode until receiving the second signal 210. The second signal 210 may be one signal of a prescheduled series of periodic signals. The second signal 210 may be a beacon signal and the series of periodic signals may be a series of beacon signals transmitted by the AP 202 at regular intervals. The time period may be a duration between transmitting of the first signal 208 from the AP 202 and transmitting of the second signal 210 from the AP 202. There may be one or more additional periodic signals transmitted by the AP between the transmitting of the first signal 208 and the transmitting of the second signal 210. In other words, there may be more than one beacon interval between the transmitting of the first signal 208 and the transmitting of the second signal 210. The second signal 210 may include a traffic indication map (TIM) or a traffic indication map (TIM) segment. The station STA2 206 may go to an asleep mode or doze mode 224*b* from the awake mode 222*a* (i.e. be deactivated) after receiving the first signal 208. The station STA2 206 may go to or an awake mode 222*b* from a doze mode 224*b* (i.e. be activated) upon expiry of the time period to receive the second signal 210. Going to or being in the doze mode 224*b* between receiving the first signal 208 and receiving the second signal 210 may reduce power consumption for the station STA2 206. The station STA2 206 may instead remain in an awake mode between receiving the first signal 208 and receiving the second signal 210.

Upon receiving the second signal 210, the station STA2 206 may further determine whether there is the buffered data stored in the AP 202 for the station STA2 206. The determination may be based on the TIM or TIM segment included in the second signal 210. The second signal 210 may include an indication for the station STA2 206 to send a subsequent polling signal 226 to the access point 202. The station STA2 206 may transmit a subsequent polling signal 226 to the AP 202. The AP 202 may transmit a data signal 228 including buffered data to the station STA2 206. The station STA2 206 may receive the data signal 228 including buffered information. The buffered information may be stored in the AP 202 for transmitting to the station STA2 206. The station STA2 206 may upon receiving the data signal 228, transmit an acknowledgement signal 230 to the AP 202. The station STA2 206 may then go to a sleep mode 224c.

When the station STA2 206 determines that there is no buffered data in the AP 202 stored for the station STA2 206, the station STA2 206 may not transmit the subsequent polling signal 226. The AP 202 may not transmit data signal 228 and the station STA2 206 may not transmit an acknowledgement signal 230. The station STA2 206 may go to the sleep mode 224c directly after receiving the second signal 210 and making the determination. The subsequent polling signal 230 may be a Powersave-Poll (PS-Poll) signal or a PS-Poll frame or a NDP PS-Poll frame or a trigger frame. The acknowledgement (ACK) signal 230 may be a ACK frame or a NDP ACK frame.

In various embodiments, a STA such as STA1 204 or STA2 206 may immediately send a polling signal i.e. a prior polling signal or a subsequent polling signal 212a, 212b, 226 immediately on activation, i.e. being changed from an asleep mode to an awake mode. In other various embodiments, the STA 204, 206 may wait for a period of time after activation to send the polling signal i.e. the prior polling signal or the subsequent polling signal 212a, 212b, 226.

The second signal 210 may include a traffic indication map (TIM) or a traffic indication map (TIM) segment. The TIM may contain the allocated association identifier (AID) of all the STAs in the vicinity. The TIM segment may contain the AID of some of the STAs in the vicinity.

A station (STA) in the vicinity of an access point (AP) may mean that the station is within an area defined by a maximum range of the AP.

Figure 2B:
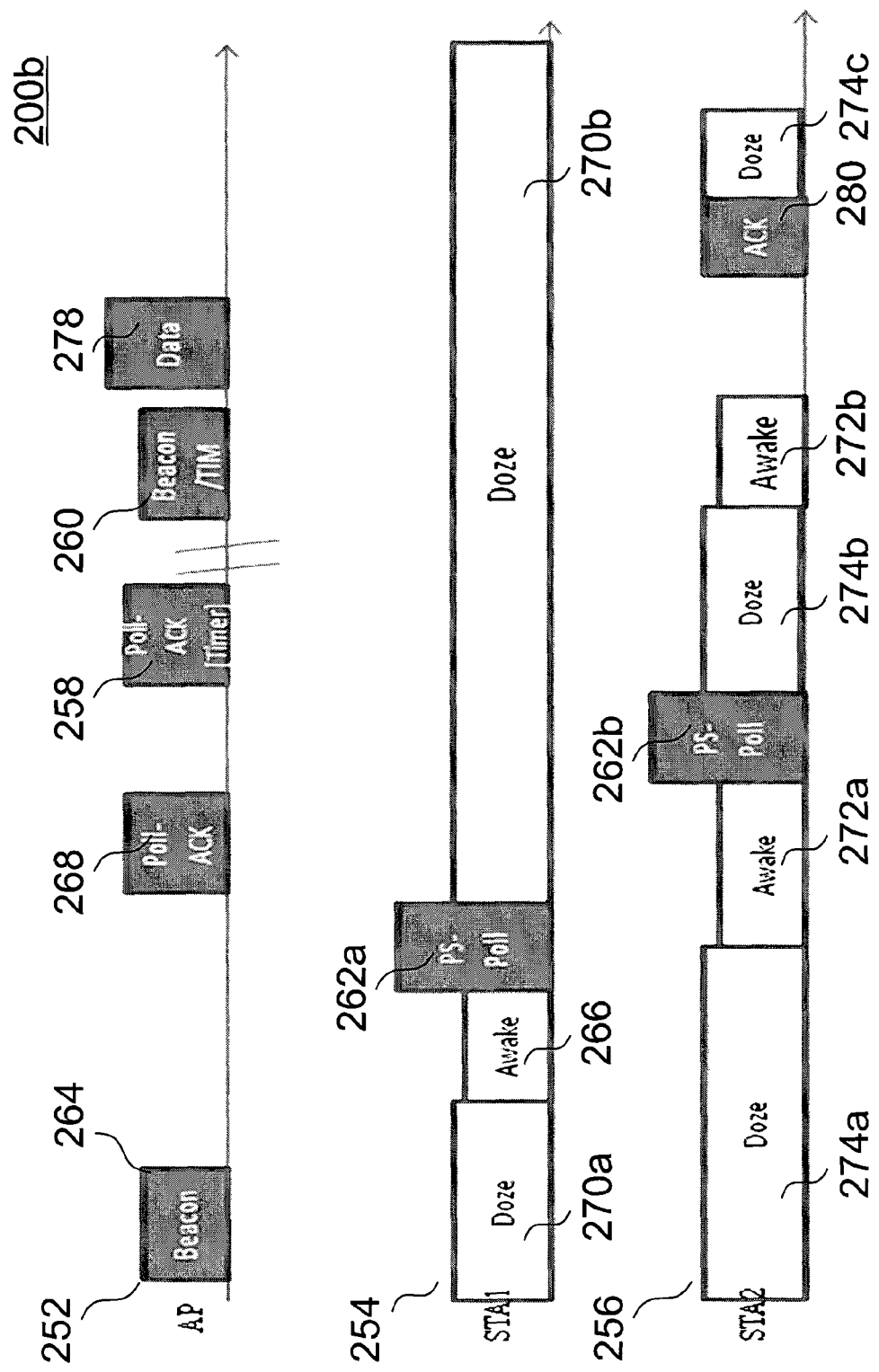
FIG. 2B is another schematic showing a method of communication between an access point (AP) and a first station (STA1) according to various embodiments and a method of communication between the access point (AP) and a second station (STA2) according to various embodiments.

FIG. 2B is a schematic 200b showing a method of communication between an access point (AP) 252 and a first station (STA1) 254 according to various embodiments and a method of communication between the access point (AP) 252 and a second station (STA2) 256 according to various embodiments. FIG. 2B also shows a method of controlling a station 254, 256 according to various embodiments and a method of controlling an access point 252 according to various embodiments.

The station STA1 254 may transmit a prior polling signal 262a. STA1 254 may in an awake mode 266 to transmit the prior polling signal 262a. The STA1 254 may need to do carrier-sensing on the channel and perform backoff procedure or other unspecified activity before sending the prior polling signal 262a. The station STA1 254 may be in an asleep mode or doze mode 270a before being activated. The AP 252 may receive the prior polling signal 262a. The AP 252 may further determine whether to transmit the first signal 258 to the station STA1 254, the first signal including information indicating a time period. The AP 252 may make the determination by checking whether there is buffered data in the AP 252 for the station STA1 254. The AP 252 may, on checking that there is no buffered data in the AP 252 for STA1 254, send an acknowledgement signal (Poll-ACK) 268 without indicating a time period for activating the station STA1 254. The acknowledgement signal 268 may inform the station STA1 254 that there is no buffered data in the AP 252 for the station STA1 254. The station STA1 254 may be in the active mode 266 to receive the acknowledgement signal 268. The station STA1 254 may then change to asleep mode or doze mode 270b. It may also be envisioned that the acknowledgement signal (Poll-ACK) 268 may indicate information indicating a time period. The station STA254 may then be activated upon expiry of the time period. The station STA 254 may be activated to send another polling signal and/or to receive a signal containing TIM or TIM segment.

The station STA2 256 may transmit a prior polling signal 262b. STA1 254 may in an awake mode 272a to transmit the prior polling signal 262b. The STA2 254 may need to do carrier-sensing on the channel and perform backoff procedure or other unspecified activity before sending the prior polling signal 262b. The station STA2 256 may be in an asleep mode or doze mode 274a before being activated. The AP 252 may receive the prior polling signal 262b transmitted from the station STA2 256. The AP 252 may further determine whether to transmit the first signal 258 to the station STA2 256, the first signal 258 including information indicating a time period. The AP 252 may make the determination by checking whether there is buffered data in the AP 252 for the station STA2 256. As shown in FIG. 2A, the AP 252 may determine that there is buffered data in the AP 252 for the station STA2 256. The AP 252 may determine the time period. The AP 252 may transmit a first signal (Poll-ACK[Timer]) 258 to the station STA2 256, the first signal 258 including information indicating a time period. The station STA2 256 may be in the active mode 222a to receive the first signal 258. The AP 252 may process the second signal 260 upon expiry of the time period. Processing the second signal may include transmitting the second signal to the station STA 256. The station STA2 256 may receive a first signal (Poll-ACK[Timer]) 258 from the AP 252, the first signal 258 including information indicating a time period. The STA2 256 may be activated upon expiry of the time period to receive the second signal 260. The station STA2 256 may switch from an asleep mode or doze mode 274b to an awake mode 272b. Alternatively, the station STA2 256 after receiving the first signal 258 may remain in an awake mode until receiving the second signal 260. The second signal 260 may be one signal of a prescheduled series of periodic signals. The second signal 260 may be a beacon signal and the series of periodic signals may be a series of beacon signals transmitted by the AP 252 at regular intervals. The time period may be indicated by a duration between transmitting of the first signal from the AP 252 and transmitting of the second signal 260 from the AP 252. There may be one or more additional periodic signals transmitted by the AP between the transmitting of the first signal 258 and the transmitting of the second signal 260. The second signal 260 may include a traffic indication map (TIM) or a traffic indication map (TIM) segment. The station STA2 256 may go to an asleep mode or doze mode 274b from the awake mode 272a (i.e. be deactivated) after receiving the first signal 258. The station STA2 256 may go to or be in an awake mode 272b from a doze mode 274b (i.e. be activated) upon expiry of the time period to receive the second signal 260. Going to or being in the doze mode 274b between receiving the first signal 258 and receiving the second signal 260 may reduce power consumption for the station STA2 256. The station STA2 256 may instead remain in an awake mode between receiving the first signal 258 and receiving the second signal 260.

Upon receiving the second signal 260, the station STA2 256 may after determining whether there is buffered data stored in the AP 252, wait for the AP 252 to transmit a data signal 278 instead of transmitting a subsequent polling signal to the access point 252. The second signal 260 may include an indication for the station STA2 256 to be awake to receive a data signal 278. Alternatively, the indication for the STA2 256 to be awake to receive a data signal 278 after receiving the second signal 260 may be communicated between the AP 252 and the station STA2 256 via prior communication, such as in the beacon signals or during the association procedure. Whether the station STA 256 transmit a data signal (or any other signal) or wait for the station to transmit a subsequent polling signal may depend on an indication included in the second signal 260 or prior agreement or prior communication between the AP 252 and the station STA2 256 or the type of prior polling signal 262b (e.g. whether the prior polling signal 262b is a PS-Poll frame or a NDP PS-Poll frame or a trigger frame. After the station STA2 256 receives the data signal 278, the station STA2 256 may transmit an acknowledgement signal 280. The station STA2 256 may go into an asleep mode or a doze mode 274c after transmitting the acknowledgement signal 280. The acknowledgement (ACK) signal 280 may include a ACK frame or a NDP ACK frame. The station STA2 256 may wait for a predetermined time interval such as a time interval of for instance less than one beacon interval e.g. less than half a beacon interval. The data signal 278 may be transmitted from the AP 252 to the STA2 256 immediately or within the predetermined time interval after transmitting the second signal 260.

In the event that the station STA2 256 is unable to receive the second signal 260 (e.g. due to receiving a wrong time period or not receiving the first signal 258), the data signal 278 may not be received by the STA2 256 and the AP may have to retransmit the first signal 258, the second signal 260 and/or data signal 278. Instead of a data signal 278, the AP 252 may also transmit any other signal indicating the time that the station STA2 256 may transmit a third signal. The station STA2 256 may follow Restricted Access Windows (RAW) operation. The RAW operation may be an RAW operation as defined under IEEE 802.11 ah SFD.

Figure 2C:
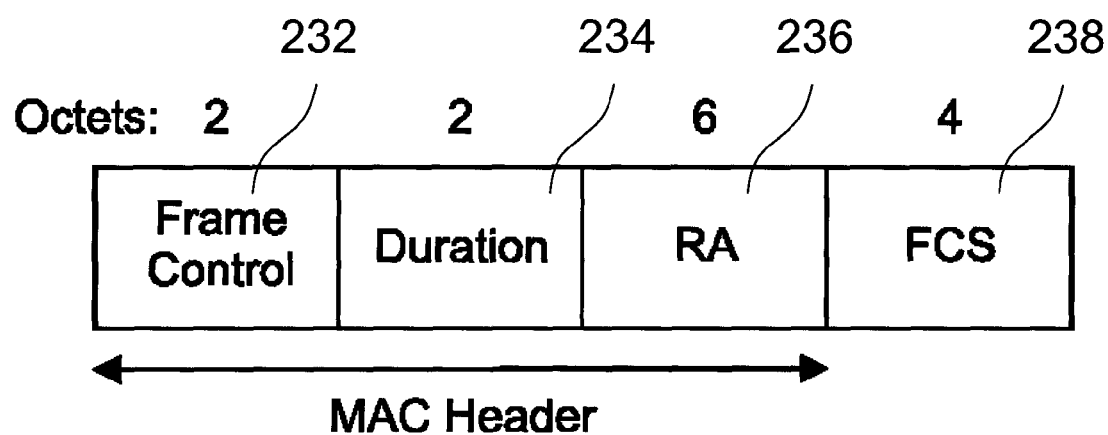
FIG. 2C is a schematic showing the frame format for a first signal according to various embodiments.

FIG. 2C is a schematic 200c showing the frame format for a first signal according to various embodiments. The fields included in the first signal may be modified from the fields included in an acknowledgement signal. An acknowledgment signal may include a frame control field 232 occupying two octets. The acknowledgment signal may further include a duration field 234 occupying two octets. In addition, the acknowledgement signal may also include a receiving station address (RA) field 236 occupying six octets and a frame check sequence (FCS) field occupying four octets. The frame format for an acknowledgement signal may as specified under IEEE standard 802.11-2007. In various embodiments, the first signal may include a duration field 234 used to contain or include the time period for activating a station. The duration field 234 may no longer be used to update the network allocation vector (NAV). The stations receiving a PS-Poll frame update may update the NAV by the interframe space plus the amount of time required to transmit an acknowledgement (ACK) signal. The automatic NAV update may allow the AP to transmit an acknowledgement signal. The time period in the duration field 234 may be used by the receiving STA or destination STA after the receiving or destination STA receives the first signal. The other stations receiving the first signal may ignore the time period information contained in the duration field 234 since there may be no following transmissions regarding PS-Polling between the transmitting the first signal and the transmitting of the second signal.

The time period contained or included in the duration field may be in time units (TUs) or a sub unit of a TU e.g. 1/10 or 1/100 of a TU. Alternatively, the time period may be in units of beacon intervals or sub units of a beacon interval e.g. 1/N beacon interval. One or more bits of the duration field may be used to indicate the units used. Various embodiments may be required to factor in clock drift for long time period. In various embodiments, one or more bits in the duration field may be used to represent different units. The units may also be transmitted from the AP to the STA using other signals such as beacon signals or other management frames. The STA may implicitly derive the time to activate to receive a subsequent signal of a series of periodic signals to obtain the units. Various embodiments may provide for greater power savings with smaller units.

The unit may be aligned to the possible ranges of a beacon interval or a time interval between receiving of consecutive signals including TIM or TIM segment. For instance, if 8 bits are used, to represent a time period of 100 TUs (time units), each bit may represent 100/255=3.92 TUs. The TU may be used to represent different time intervals. Under IEEE Standard 802.11 2007, 1 TU may be equivalent to 1024 μs. Under IEEE Standard 802.11 ah, 1 TU may be used to represent different time intervals under different circumstances. For instance, 1 TU may be equivalent to 1 ms when used to represent the time period for the wakeup timer in a NDP ACK frame but 1 TU may be equivalent to 40 μs when used to indicate transmission duration of the frames.

The time period may be less than 100 beacon intervals e.g. less than 50 beacon intervals, e.g. less than 5 beacon intervals, e.g. less than 2 beacon interval, e.g. less than 1 beacon interval.

Alternatively, the time period may be less than 100 TUs, e.g. less than 50 TUs, e.g. less than 5 TUs, less than 1 TU, less than 1/10 of a TU e.g. less than 1/60 of a TU.

In various other embodiments, the first signal may be modified from an acknowledgement signal by extending the frame format to form a new format (control subtype) control message. The first signal may include a timer field. The timer field may include information indicating the time period. The timer field may be inserted between the TA field and the FCS field. Under IEEE standard 802.11-2007, control subtypes 0000-0111 may be reserved. Any one of the reserved control subtypes may be used for the new control message. In various embodiments, the first signal may be a NDP ACK signal or a NDP ACK frame.

In various embodiments, the prior polling signal may be a low power polling signal. The subsequent polling signal may also be a low power polling signal. A low power polling signal may be indicated by defining a low power poll bit. The low power poll bit may be defining PS-Poll unused fields/bits or extended fields/bits. The station may transmit the lower power polling signal without receiving a signal including TIM or TIM segment.

On receiving the low power polling signal, the AP may delay transmitting the response signal, i.e. the AP may not respond to the low power polling signal immediately. In various embodiments, the method may include a prior polling signal. The method may further include transmitting information in a first signal if the time period from receiving the prior polling signal to transmitting the first signal is less than a predetermined duration. The method may include receiving a further prior polling signal from the station otherwise. The first signal may include information indicating the time period.

In various embodiments, the AP may determine a time period. The AP may then transmit a first signal to the station. The first signal may include information indicating the time period. The AP may process the second signal upon expiry of the time period. Processing the second signal may include transmitting the second signal to the station.

The station may receive the first signal from the access point. The first signal may include information indicating the time period. The station may be deactivated after receiving the first signal and before expiry of the time period. The station may be activated upon expiry of the time period. The station may be activated upon expiry of the time period to receive a second signal from the access point. The second signal may include a TIM or a TIM segment. The second signal may be a beacon signal or a short beacon signal. The second signal may be one signal of a prescheduled series of periodic signals. Various embodiments may provide a method to synchronize the activation of a station to receive the second signal to correct clock drift after a long sleep time.

In various embodiments, the duration field may include the low power poll bit. One of the unused bits in the duration field for a polling signal may be used as the low power poll bit. FIG. 2D is a table 200d showing the usage of different bits in the duration field. There may be three reserved ranges 240, 242 and 244 for defining a low power poll bit. For instance, bit 13 may be used as the lower power poll bit when bit 14=1 and bit 15=1 under reserved range 244. In various embodiments, the duration field of a response signal to a polling signal (i.e. the first signal) may include the time period. For instance bits 0-13 may be used when bit 14=0 and bit 15=1 under reserved range 240.

In various embodiments, the power management bit under the frame control field may also be used as the low power poll bit. For instance, the power management bit may be set to 0 when transmitting a low power polling signal. Alternatively, in various embodiments, the Frame Control Field may include the low power poll bit. One of the unused bits in the Frame Control Field for a polling signal may be used as the low power poll bit.

In various embodiments, the compressed medium access control (MAC) header for control frame may include the low power poll bit.

The low power poll bit may also be included under a new control frame type using reserved 0000-0110.

Other low power STAs may also receive the first signal. The other STAs may also be deactivated after receiving the first signal and before expiry of the time period. The other stations may also be activated upon expiry of the time period. In other words, various embodiments include a method of communication between an access point and a plurality of stations.

In other words, the method may include transmitting a first signal from the access point to the plurality of stations. The first signal may include information indicating at time period. The method may further include deactivating the plurality of stations after the plurality of stations receives the first signal but before expiry of the time period. The methods may also include activating the plurality of stations upon expiry of the time period.

The first signal may include at least two fields. The first field may include an identification of the AP such as a MAC address e.g. basic service set identification (BSSID). The second field may include the time period.

The first signal may be transmitted only to the STA which transmit the prior polling signal. This may be known as unicast. The destination address (DA) may be the AID or MAC address of the STA that transmit the prior polling signal. If the source address (SA) is different from the BSSID, then the SA may be used. It may not be applicable to derive the SA or the SA may be required.

The first signal may also be transmitted to a plurality of STAs using a broadcast. For a broadcast, the plurality of stations may include all the stations within the vicinity of the AP. The destination address (DA) may include a broadcast AID or a broadcast MAC address for the STA sending the prior polling signal.

The first signal may also be transmitted to a plurality of STAs using a multicast. For a multicast, the plurality of stations may include more than one stations within the vicinity of the AP. The destination address (DA) may include a multicast AID or a multicast MAC address for the STA sending the prior polling signal.

Various embodiments may provide for rescheduling multiple time periods in which stations are awake for multiple stations.

After receiving the prior polling signal (or subsequent polling signal) with the low power polling bit (e.g. the low power polling bit set as 1), the AP may determine to transmit a data signal including buffered data if there is buffered data stored in the AP. The buffered data stored in the AP may be for the STA transmitting the prior polling signal or subsequent polling signal. Buffered data may be transmitted if there no other data/management frames to transmit. The AP may also determine whether to transmit a control signal or an acknowledgement signal. The control signal or acknowledgement signal may be transmitted with short interframe space (SIFS). The control signal or acknowledgement signal may include a Buffered Unit (BU). The Buffered Unit (BU) bit may use the More Data sub field under the Frame Control field. The Buffered Unit (BU) bit may be set as 1 or 0 depending on whether there is buffered data stored in the AP. The buffered data stored in the AP may be for the STA transmitting the prior polling signal or subsequent polling signal. The BU bit may be the More Data bit under Frame Control field. The AP may also determine to transmit the first signal. The first signal may include information indicating a time period. The first signal may or may not include an indication indicating whether there is buffered data stored in the AP. The buffered data stored in the AP may be for the STA transmitting the prior polling signal or subsequent polling signal.

If the STA receive a data signal from the AP, it may transmit an acknowledgement signal. If the STA receives an acknowledgement signal or a control signal, the STA may determine whether there is buffered data stored in the AP for the STA. If the STA determined that there is no buffered data stored in the AP for the STA, it may deactivate.

If the STA receives a first signal with a time period. It may be deactivated after receiving the first signal and before expiry of the time period. The STA may be activated upon expiry of the time period. The STA may be activated upon the expiry of the time period to receive a second signal. The second signal may include a TIM or TIM segment. If the TIM or TIM segment indicates that there is buffered data stored in the AP for the STA, the STA may then send a subsequent polling signal. The AP may transmit a data signal after receiving the subsequent polling signal. In various alternate embodiments, the STA may receive a data signal without transmitting a subsequent polling signal.

If the first signal indicates that there is no buffered data stored in the AP for the STA, the STA may be deactivated. The STA may be activated upon expiry of the time period. The STA may also instead ignore the time period. The STA may be deactivated immediately after receiving the first signal.

If the first signal does not include an indication whether there is buffered data stored in the AP for the STA, the STA may be deactivated. The STA may be activated upon expiry of the time period. The STA may be activated upon expiry of the time period to receive a second signal. The second signal may include a TIM or a TIM segment. The TIM or TIM segment may indicate whether there is buffered data stored in the AP for the STA.

If the receiver address is indicated with a multicast address or a broadcast address, the first signal is addressed to a plurality of STAs. The other STAs receiving the first signal may also be deactivated until expiry of the time period. The other STA may be activated upon expiry of the time period.

The prior polling signal or subsequent polling signal may also not include a low power polling bit. Upon activation, the STA sends a prior polling signal without the low power polling bit. Upon receiving the prior polling signal, the AP may determine whether to send a control signal, an acknowledgement signal or a first signal (similar to the case when the AP receives a prior polling signal including a low power polling bit). The AP may transmit a control signal or acknowledgement signal with SIFS instead for a data signal with distributed interframe space (DIFS) in response to the prior polling signal.

Figure 3A:
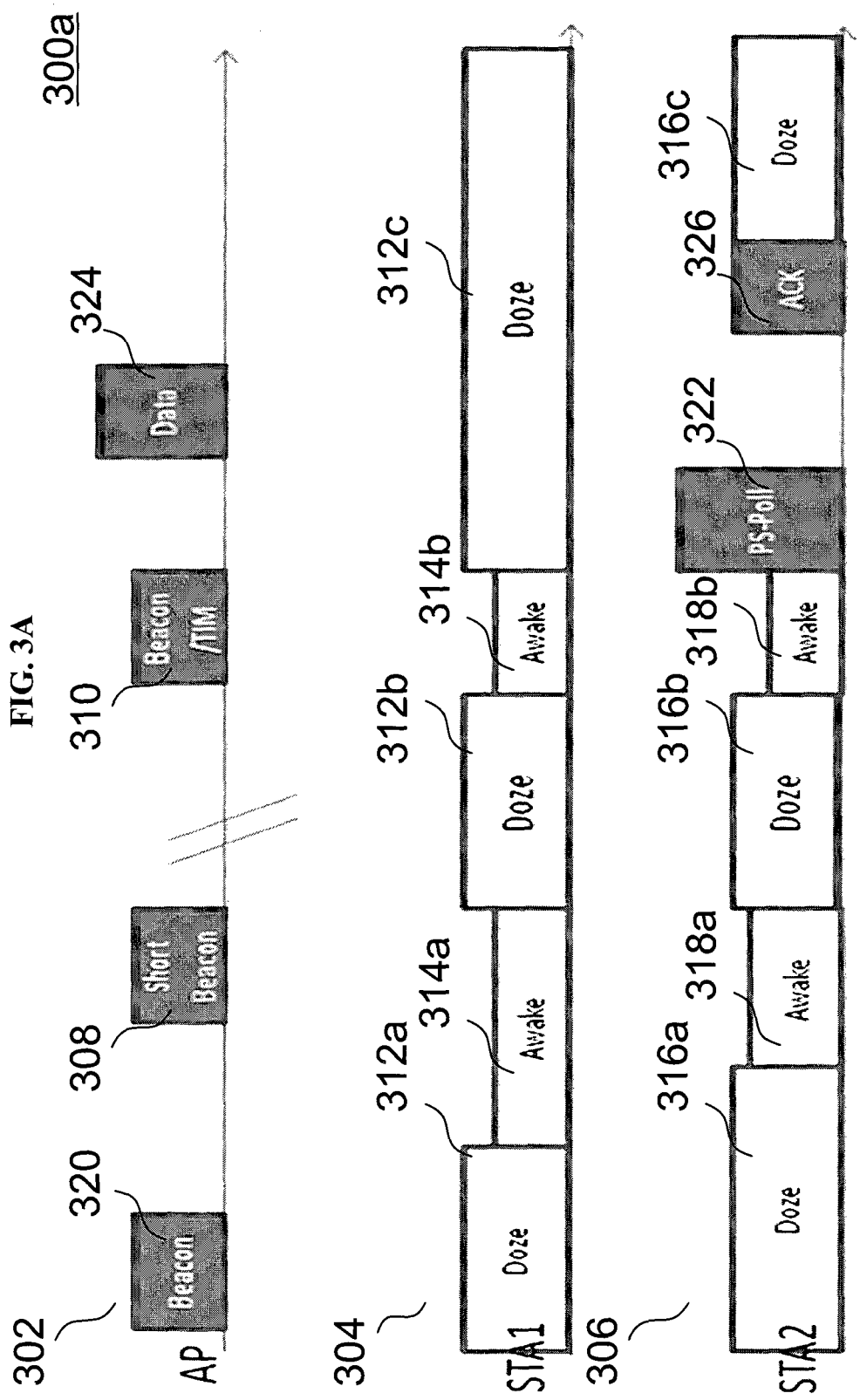
FIG. 3A is another schematic showing a method of communication between an access point (AP) and a first station (STA1) according to various embodiments and between the access point (AP) and a second station (STA2) according to various embodiments.

FIG. 3A is a schematic 300*a* showing a method of communication between an access point (AP) 302 and a first station (STA1) 304 according to various embodiments and between the access point (AP) 302 and a second station (STA2) 306 according to various embodiments. FIG. 3A also shows a method of controlling a station 304, 306 and a method of controlling an access point 302. FIG. 3A also shows a method of communication between an access point 302 and a plurality of stations 304, 306.

The method may include transmitting a first signal 308 from the access point AP 302 to a plurality of stations (for instance STA1 304 and STA2 306), the first signal 308 including information indicating a time period. The method further includes deactivating the plurality of stations 304, 306 after the plurality of stations 304, 306 receives the first signal 308 but before expiry of the time period. The method also includes activating the plurality of stations 304, 306 upon expiry of the time period. The method may further include transmitting a second signal 310 from the AP 302 to the plurality of stations 304, 306 upon reaching expiry of the time period. In various embodiments, the plurality of stations 304, 306 may be activated upon expiry of the time period to receive a second signal 310 from the AP 302.

The first signal 308 may be a short beacon signal. The first signal 308 may be one signal of a prescheduled series of periodic signals. The second signal 310 may be a beacon signal. The second signal 310 may also be a part of a prescheduled series of periodic signals 310, 320. Beacon signal 320 may also be one signal of the prescheduled series of periodic signals 310, 320. In various embodiments, the first signal 308 and the second signal 310 may be different signals of the same prescheduled series of periodic signals. The second signal 310 may include TIM or TIM segment.

The time may be indicated by a duration between transmitting of the first signal 308 from the AP 302 and transmitting of the second signal 310 from the AP 302. The duration may be in time units (TUs). Each TU may be equal to 1024 μs. The station STA1 304 or STA2 306 or both STA1 304 and STA2 306 may receive a first signal 308 from the access point 302. The first signal may include information indicating a time period. The AP 302 may determine the time period. The AP 302 may transmit the first signal to the station(s) STA1 304 or STA2 306 or both STA1 304 and STA2 306. The station STA1 304 or STA2 306 or both STA1 304 and STA2 306 may be in an awake mode 314*a*, 318*a* to receive the first signal 310. The first signal 308 may include TIM or TIM segment. The TIM or TIM segment may indicate no buffered data stored in the AP 302 for the station STA1 304 or STA2 306. Accordingly, the station STA1 304 or STA 2 306 or both the stations STA1 304 and STA 306 may go into an asleep mode or doze mode 312*b*, 316*b* after receiving the first signal 310. In other words, the method may include deactivating the station STA1 304 or the station STA2 306 or both the stations STA1 304 and STA 306. The station STA1 304 or STA2 306 or both the stations STA1 304 and STA 306 may be in an asleep mode or doze mode 312*a*, 316*a* before being activated to receive the first signal 310. The station STA1 304 or STA2 306 may go or be in an awake mode 314*b*, 318*b* (i.e. be activated) upon expiry of the time period to receive the second signal 306. The AP 302 may process the second signal 310 upon expiry of the time period. Processing the second signal 310 may include transmitting the second signal 310 to the station(s) STA1 304 or STA2 306 or both STA1 304 and STA2 306.

The station STA1 304 or STA2 306 or both STA1 304 and STA2 306 may go to or be in an asleep mode or doze mode 312*b*, 316*b* after receiving the first signal 308 and before receiving the second signal 310. In other words, the method may include deactivating the station(s) STA1 304 or STA2 306 or both STA1 304 and STA2 306 after receiving the first signal 308 and before expiry of the time period. The method may further include activating the station(s) STA1 304 or STA2 306 or both STA1 304 and STA2 306 upon expiry of the time period. In various alternate embodiments, one or more of the stations 304, 306 may remain in an awake mode after receiving the first signal 308 and before receiving the second signal 310.

The station STA1 304 or STA2 306 may determine whether there is buffered data stored in the AP 302 for the station STA1 304 or STA2 306. The station STA1 304 or STA2 306 may determine whether there is buffered data stored in the AP 302 for the station STA1 304 or STA2 306 based on the second signal 310. The second signal 310 may include a TIM or TIM segment for the station STA1 304 or STA2 306 to make the determination. The second signal 310 may include an indication indicating whether there is buffered data stored in the AP for the station STA1 304 or STA2 306 or both STA1 304 and STA2 306.

The station STA1 304 may determine that there is no buffered data stored in the AP 302 for the station STA1 304. The station 304 may upon determination, go into an asleep mode or doze mode 312*c*. In contrast, the station STA2 306 may determine that there is buffered data stored in the AP 302 for the station STA2 306. The second signal 310 may also include an indication for the station STA2 306 to send a subsequent polling signal 322 to the AP 302. The station STA2 306 may then transmit the subsequent polling signal 322 to the AP. The AP 302 may transmit a data signal 324 including buffered data. The buffered data may be stored in the AP for transmitting to the station STA2 306. The station STA2 306 may receive the data signal 324 including the buffered information. The station STA2 306 may upon receiving the data signal 324, send an acknowledgment signal 326 to the AP 302. The station STA2 306 may after sending the acknowledgement signal 326, go into an asleep mode or doze mode 316c.

In various alternate embodiments, the second signal 310 may include an indication for the station STA2 306 to stay awake to receive the data signal 324. The data signal 324 may be transmitted from the AP 302 to the station STA2 306 within a predetermined time interval or immediately after transmitting of the second signal 310.

Target Beacon Transmission Time (TBTT) may refer to the time by which the AP must send a beacon signal. Target TIM Segment Transmission Time (TTSTT) may refer the time by which a target TIM segment to a STA must be transmitted by the AP. TTSTT may be provided in beacon intervals (long or short) or TUs. If all the TIM segments are fitted into one TIM frame, TTSTT may be TBTT. Target TIM Transmission Time (TTTT) may refer to the time by which the AP must send a TIM signal.

A communication system using segmented TIM in which the AP is not synchronized with the associated STAs may not be able to ensure that each of the STA receives its relevant TIM segment. The TIM segments may be transmitted every some beacon (long or short) signals and a STA may miss receiving some of the relevant segments due to the STA's awake/doze schedule. A relevant TIM segment for a STA may refer to a TIM segment that includes the AID for the STA.

In various embodiments, a STA that is activated after being in the asleep mode or doze mode may remain awake for a period of time more than or equal to one beacon interval (e.g. 100 ms) or for a period of time more than an interval between two consecutive signals. The consecutive signals may include TIM segments.

When a STA remain awake for a period of time more than or equal to one beacon interval, the STA may receive a first signal such as a beacon signal. When a STA remains awake for a period more than an interval between two consecutive signals, the STA may receive a first signal such as a control signal.

The first signal may have a TIM segment that is not relevant to the STA. In other words, the TIM segment may not indicate whether buffered data for the STA is stored in the AP.

However, the first signal such as a beacon signal may include an indication on when a second signal including the TIM segment relevant to the STA is transmitted. The first signal may further include information indicating a time period. The time period may be indicated by a duration between transmission of the first signal and transmission of the second signal. The time period may be or may include TTSTT. The information indicating a time period may include information that allows the STA to determine the TTSTT. The AP may determine the time period.

For example, all the STAs in the vicinity of an AP may be grouped into a few groups, each group having a relevant TIM segment. Each group may include at least one STA. The TIM segment transmitted by the first signal to a target STA, the target STA belonging to a target group, may include a group identification. The TIM segment may not be relevant for the target group, i.e. the TIM segment does not contain the AIDs for any of the group STAs. The group identification may identify a further group in which the TIM segment is relevant for. The STA may determine using a predefined relation between the first signal (including TIM segment for the further group) and the second signal (including TIM segment for the target group) to determine a duration between transmitting of the first signal (including TIM segment for the further group) from the access point and transmitting of the second signal (including TIM segment for the target group) from the access point, i.e. the TTSTT. There may also be further communication between the AP and the target STA to determine the duration. Beacon signals may include short beacon signals and/or full beacon signals. The TIM Segment Count Information Element may include information on how the AP send out the TIM segments in the beacon signals such as the first signal and the second signal. The DTIM beacon signal may include the TIM Count Information Element.

A first signal such as a control signal may also include an indication on when a second signal including the TIM segment relevant to the STA is transmitted. Different signals including different TIM segments may be transmitted (by the AP) in a predefined manner. The STA on receiving the first signal may be able to determine the duration between the transmitting of the first signal from the access point and the transmitting of the second signal from the access point. The second signal may be the signal having the TIM segment relevant to the STA.

The STA may go into an asleep mode or doze mode after receiving the first signal. In other words, the STA may be deactivated after receiving the first signal and before expiry of the time period. The STA may be activated upon the expiry of the time period. Various embodiments may reduction in power consumption of the STA during the asleep mode or doze mode.

In various embodiments, a method of communication between an access point (AP) and a plurality of stations (STAs) may be provided. The method may include the AP grouping one or more stations (STAs) to form a plurality of stations. The plurality of stations may have about the same listening interval. The method may include transmitting the first signal from the AP to the plurality of stations. The first signal may not include the relevant TIM segment for the plurality of stations. The first signal may include information indicating a time period. The expiry of the time period may be a time by which the AP will transmit a second signal including the relevant TIM segment for the plurality of stations. The plurality of stations may be deactivated after the plurality of stations receives the first signal but before expiry of the time period. The plurality of stations may be activated upon expiry of the time period.

For example, a first station of the plurality of stations may have a listening interval less than 25% e.g. less than about 10% e.g. less than 5% greater (or smaller) than a listening interval of a second station of the plurality of stations. The method may further include transmitting a prior polling signal from one or more of the plurality of stations (STAs). The plurality of STAs may refer to a predefined group of STAs. In other words, as long as one or more STAs in the predefined group send a prior polling signal to the AP, the AP may transmit the first signal to all STAs within the predefined group. The predefined group may have allocated AIDs within a TIM segment included in the second signal. Various embodiments may provide for low power consumption as the TIM that may require a long time to transmit may be transmitted in segments to groups of STAs, each group of STAs having allocated AIDs that fall within a TIM segment.

The AP may assign a specific delivery traffic indication (DTIM) count to each of the plurality of stations. The AP may also assign time offsets to each of the plurality of stations. The time offset assigned to a first station of the plurality of stations may be the same or may be different from the time offset assigned to a second station of the plurality of stations.

The method may further include transmitting a prior polling signal from one or more STAs of the plurality of STAs to the AP. The AP may determine when to transmit the first signal. The determination may be based on the listening intervals of the STAs to coincide with the TBTT or TTSTT or TTTT of the AP. The STAs may be configured for a similar TBTT or TTSTT or TTTT.

The method may also include each STA (of the plurality of STAs) receiving a first signal from the AP. In other words, the method includes transmitting a first signal from the AP to the plurality of STAs. The first signal may be a signal including a TIM or a TIM segment such as an acknowledgment signal (with TIM or TIM segment) or a beacon signal (with TIM or TIM segment).

The AP may make also determine whether the first signal transmitted is, for instance, an acknowledgment signal (with TIM or TIM segment) or a beacon signal (with TIM or TIM segment).

Each STA in the plurality of STAs may be configured for about the same TBTT or TTSTT or TTTT. For example, a first station of the plurality of stations may be configured for a first TBTT/TTSTT/TTTT while a second station of a plurality of stations may be configured for a second TBTT/TTSTT/TTTT. The first TBTT/TTSTT/TTTT may be less than 25% e.g. less than about 10% e.g. less than 5% greater (or smaller) than the second TBTT/TTSTT/TTTT.

The TIM segment or TIM included in the first signal may be relevant to all the STAs in the plurality of STAs. In other words, the TIM segment or TIM included in the first signal may indicate whether there is buffered data stored in the AP for each STA in the plurality of STA.

Each STA in the plurality of STA may determine whether there is buffered data stored in the AP for itself after receiving the first signal.

The first signal may also include information indicating a time period.

The method may further include transmitting a second signal from the AP to one or more stations of the plurality of stations upon expiry of the time period. The one or more stations may be activated upon expiry of the time period to receive the second signal. The second signal may be a data signal including buffered data.

Only stations determined to have buffered data stored in the AP for the stations may be activated. In other words, only stations with buffered data stored in the AP for the stations may be required to be activated to receive the second signal. The other stations may remain in the sleep mode or the doze mode. When a STA determines that there is buffer data stored in the AP for the STA, the STA may send a further polling signal to the AP. The further polling signal may be transmitted from the STA to the AP upon expiry of the time period. The AP may send the second signal on receiving the polling signal.

Alternately, the AP may send the second signal (e.g. data signal including buffered data) directly to the one or more stations as it may have been determined that stations with buffered data in the AP are activated upon expiry of the time period. Since the plurality of stations may have about the same listening interval and the AP may have determined to appropriate time to send the second signal such that all stations with buffered data in the AP are activated (i.e. in an awake mode) at that time, the second signal may be sent directly to all stations of the plurality of stations.

Various embodiments may reduce power consumption of STAs as the first signal is sent to the STAs at a higher data rate and reduces the time for the STAs to be in an awake mode to receive the first signal.

Various embodiments may reduce contention between STAs as the STAs to be grouped to form the plurality of STAs have similar listening intervals and the first signal is transmitted to multiple STAs (i.e. the plurality of STAs) at a time.

In various embodiments, the second signal may include information indicating the time interval for the station to transmit a data signal to the AP, i.e. transmit uplink data. The station may be activated upon expiry of the time period to receive the second signal from the AP.

In various alternate embodiments, the first signal received by the station includes information indicating the time interval for the station to transmit a data signal to the AP. The first signal may include time slot assignment information. The station may be activated upon expiry of the time period to transmit a second signal to the access point.

The first signal may be transmitted by the AP to the station in response to a prior polling signal transmitted from the station to the AP. The prior polling signal may be a Null Data Packet (NDP) MAC frame type polling signal. The NDP MAC frame type may be a frame type with the NDP Indication field of the SIG (signal) field set to 1. A NDP MAC frame type may be a frame with PHY SIG fields but without a MAC frame body. The AP may determine whether to transmit the first signal. The AP may also determine the time period. The AP may transmit the first signal to the station. The AP may process the second signal upon expiry of the time period. Processing the second signal includes transmitting the second signal to the station. In various alternate embodiments, processing the second signal includes receiving the second signal from the station. The second signal may in this case, be or include a data signal.

Various embodiments may help a station reduce power consumption by deactivating the station after the station receives the first signal and before expiry of the time period.

In various embodiments, the first signal may be or includes a probe response signal. The first signal may be or includes a probe response signal to a probe request signal. A probe request signal may be or may include a short probe request signal.

An AP may on receiving a short probe request signal transmit a probe response signal in the working channel. The AP may transmit a probe response signal concurrently due to duplicate service set identifier (SSID) information.

Figure 3B:
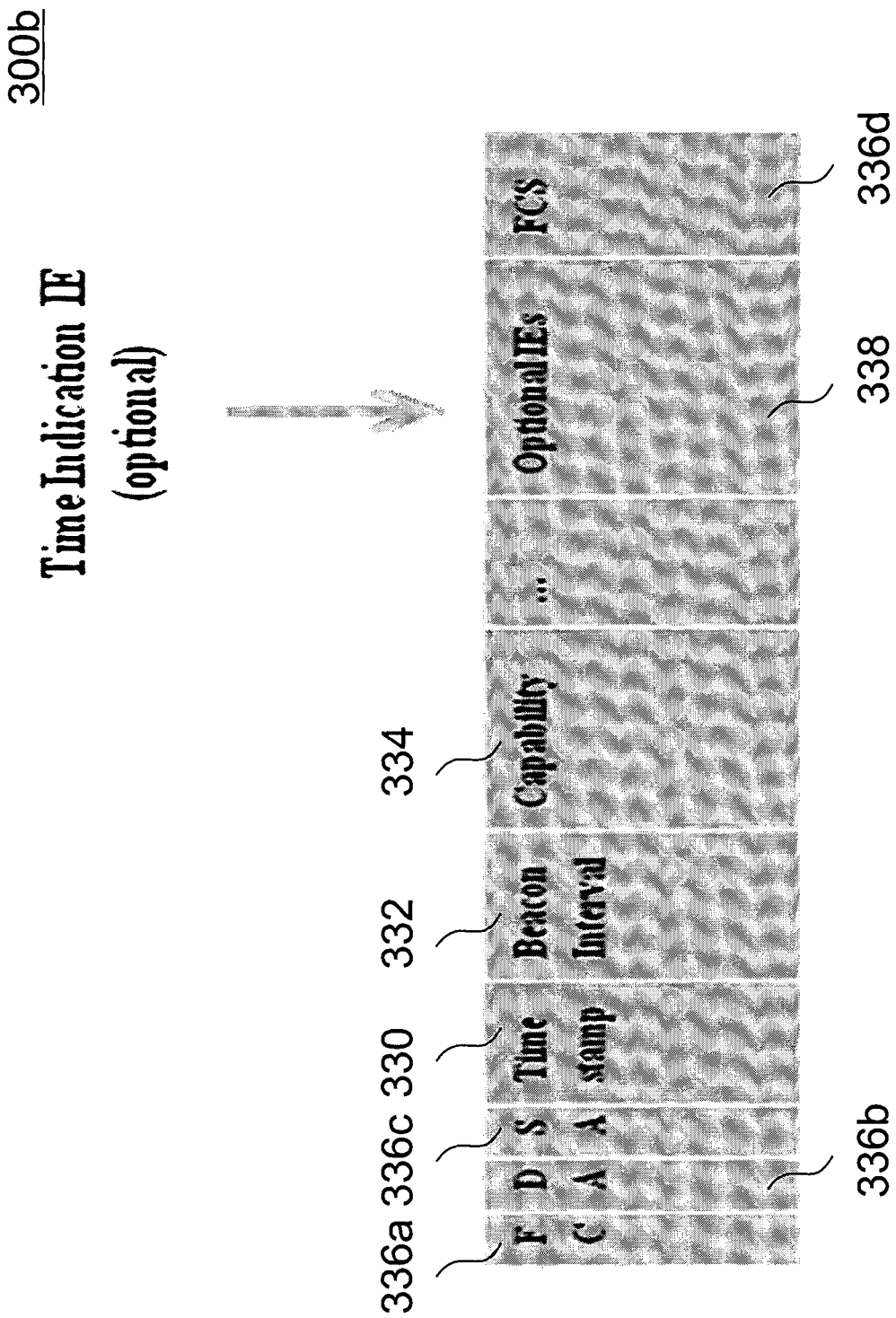
FIG. 3B is a schematic showing a portion of a frame format with some fields for a probe response signal according to various embodiments.

FIG. 3B is a schematic 300b showing a portion of a frame format with some fields for a probe response signal according to various embodiments. A short probe response signal may include a Timestamp field 330, a Beacon Interval field 332, a Capability field 334 and a Optional Information Elements 338 field. The short response request signal may include either a compressed SSID field or a full SSID field. The short probe response signal may include a frame control field, 336a, a Duration to Next Full Beacon field 336b, a source address field 336c, a frame check sequence field 336d and other fields. The Frame Control field 336a may include a Next Full Beacon present subfield, a Full SSID present subfield, a Basic Service Set (BSS) subfield and a Security subfield. The Full SSID present subfield may indicate whether a Full SSID or a compressed SSID should be included.

A station may tolerate channel latency between transmitting a probe request signal to an AP and receiving a probe response from the AP. Restrict Access Window (RAW) or Target Wake Time (TWT) operations may require interruptions such as probe request signals due to active scanning be minimized. Events such as power outage may cause a large number of stations to reset. Active scanning may trigger a large number of short probe request signals. Various embodiments provide a method to spread out processing the short probe request signals.

A station may transmit a prior signal to the AP such as a probe request signal (e.g. a short probe request signal). The AP may determine a time period. The AP may transmit a first signal to the station. The first signal may include information indicating the time period. The AP may then process a second signal upon expiry of the time period, such as transmitting the second signal to the station. Alternatively, processing the second signal upon expiry of the time period may include receiving the second signal upon expiry of the time period. The second signal may include a beacon signal. The second signal may include information indicating the station to transmit a request for authentication or association. The station may receive a first signal from the access point. The first signal may include information indicating a time period. The station may be deactivated after receiving the first signal and before expiry of the time period. The station may be activated upon expiry of the time period. The station may be activated upon expiry of the time period to receive a second signal from the AP. In various alternative embodiments, the station may be activated upon expiry of the time period to transmit a second signal to the AP.

The short probe response signal may include the time period. The time period may be included under the Optional IEs field 338.

Figure 3C:
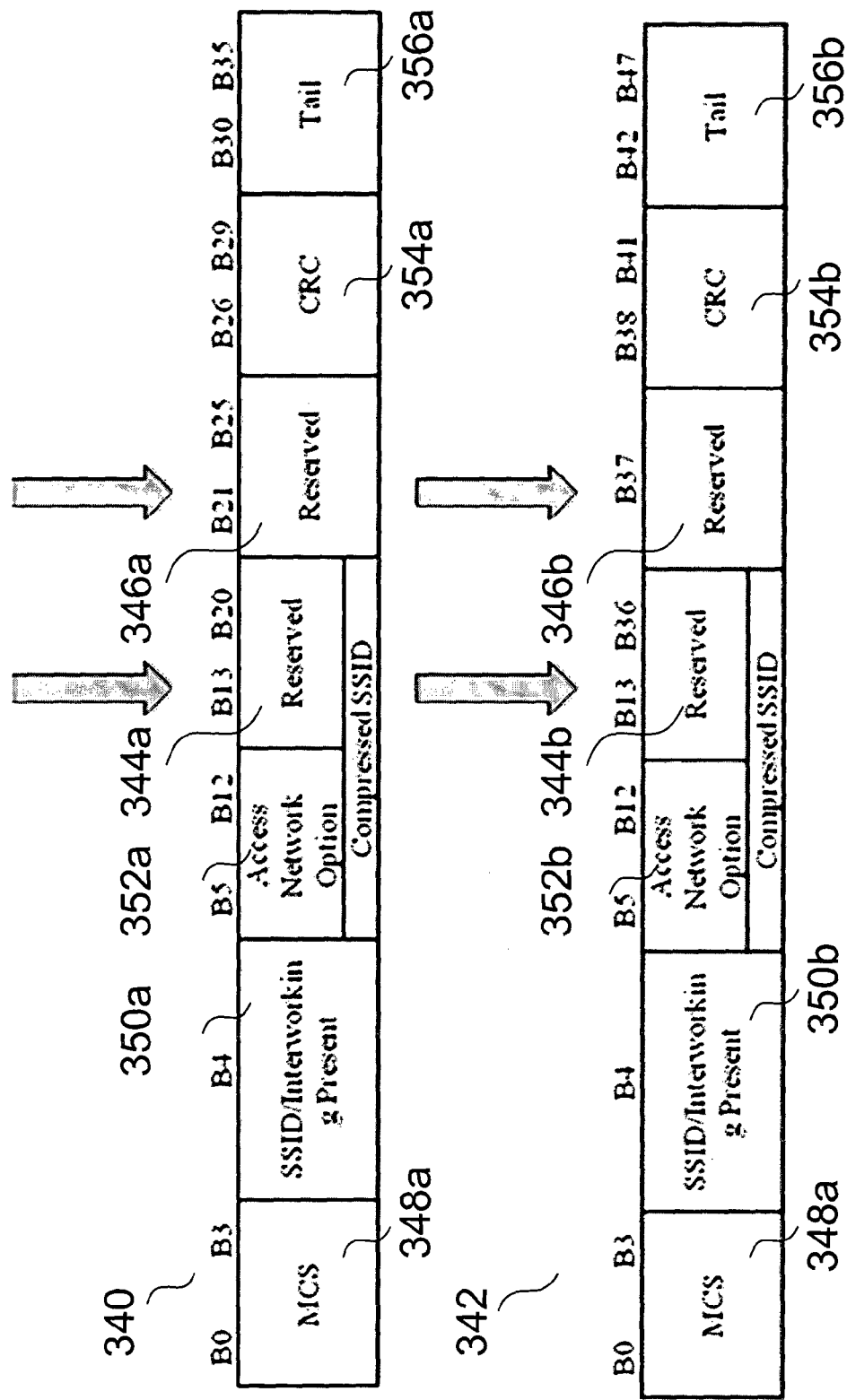
FIG. 3C is a schematic showing a first frame format and a second frame format for a probe request signal according to various embodiments.

The short probe request may include a deferrable bit. FIG. 3C is a schematic 300c showing a first frame format 340 and a second frame format 342 for a probe request signal according to various embodiments. The short probe request may include a medium access control service field 348a, 348b, a SSID Interworking Present field 350a, 350b, a Access Network Option field 352a, 352b, reserve fields 344a, 344b, 346a, 346b. a cyclic redundancy check (CRC) field 354a, 354b and a tail filed 356a, 356b. Any one of the reserved bits 344a, 344b, 346a, 346b may be the deferrable bit.

When an AP receives a probe request signal that may have a deferrable bit set to 1, the AP may determine whether to transmit a probe response signal without indicating a time period (i.e. an immediate probe response signal) or to transmit a first signal including information indicating a time period. The probe response signal or first signal may include full SSID signal for the station to determine whether the AP is the one the station is going to authenticate or associate.

When an AP receives a probe request signal that may have a deferrable bit set to 0, the AP may transmit an immediate probe response signal.

The AP may also determine, regardless the deferrable bit, whether to transmit a probe response signal without indicating a time period (i.e. an immediate probe response signal) or to transmit a first signal including information indicating a time period.

The probe response signal may include a value. The value may be randomly generated by the AP. The station may generate a filter. The station may determine whether to send a linking signal (e.g. an authentication request signal or an association request signal) to the AP based on whether the value falls within the range of values of the filter. The AP may also set up a RAW operation. The RAW operation may disallow authentication request transmitted by the station with predetermined time intervals in a beacon interval.

In various embodiments, the method may include grouping or pre-grouping a plurality of stations. The plurality of stations may include all stations within a vicinity of the access point. In this method, the grouping or pre-grouping may be based on the information indicated in the probe request signal and/or probe response signal. A station may send out a probe request signal before authentication/association and am access point may reply with a probe response signal. The probe request signal and/or probe response signal may include information such as Vendor-specific information on how the station may be grouped with one or more stations in the vicinity of the access point. The station may be arranged in a group for carrying out authentication/association procedures with the AP simultaneously with the other stations in the group.

In various embodiments, the station may be provided with information indicating a time period (e.g. a timer). The information indicating the time period may be included in a first signal such as a probe response signal or a beacon signal. The station may start authentication/association procedures upon expiry of the time period. The reference point (the starting) of the time period may be the timestamp specified in the first signal such as the probe response signal or the beacon signal. The stations may be considered to be in a group if they are able to carry out authentication/association upon expiry of the time period. For example, the timer may be specified in the units of beacon intervals or TUs. Upon expiry of the time period, the station may be able to carry out authentication/association procedures for a duration. The duration may be specified in the units of beacon intervals or TUs. Moreover, the grouping or pre-grouping may be applied to a repeated pattern that the station after a specified time will carry out the authentication/association procedures again after the duration in which it is allowed to do so ends. The station may carry out the authentication/association procedures again if the authentication/association procedures are unsuccessful. This repetition period may be in the units of beacon intervals or TUs is another parameter. The repetition period may be specified the first signal. The access point may instruct the station to follow the parameters such as the time period, duration and/or repetition period in the probe response signal or beacon signal.

In various alternate embodiments, the station may propose some parameters (e.g. time period, duration and/or repetition period) in a prior polling signal such as a probe request signal to the access point. The access point may further instruct or negotiate with the station.

The pre-grouping may also be implemented in other management frames other than probe request signal or a probe response signal as long as such management frames be exchanged between the station and the access point before authentication/association.

Figure 4A:
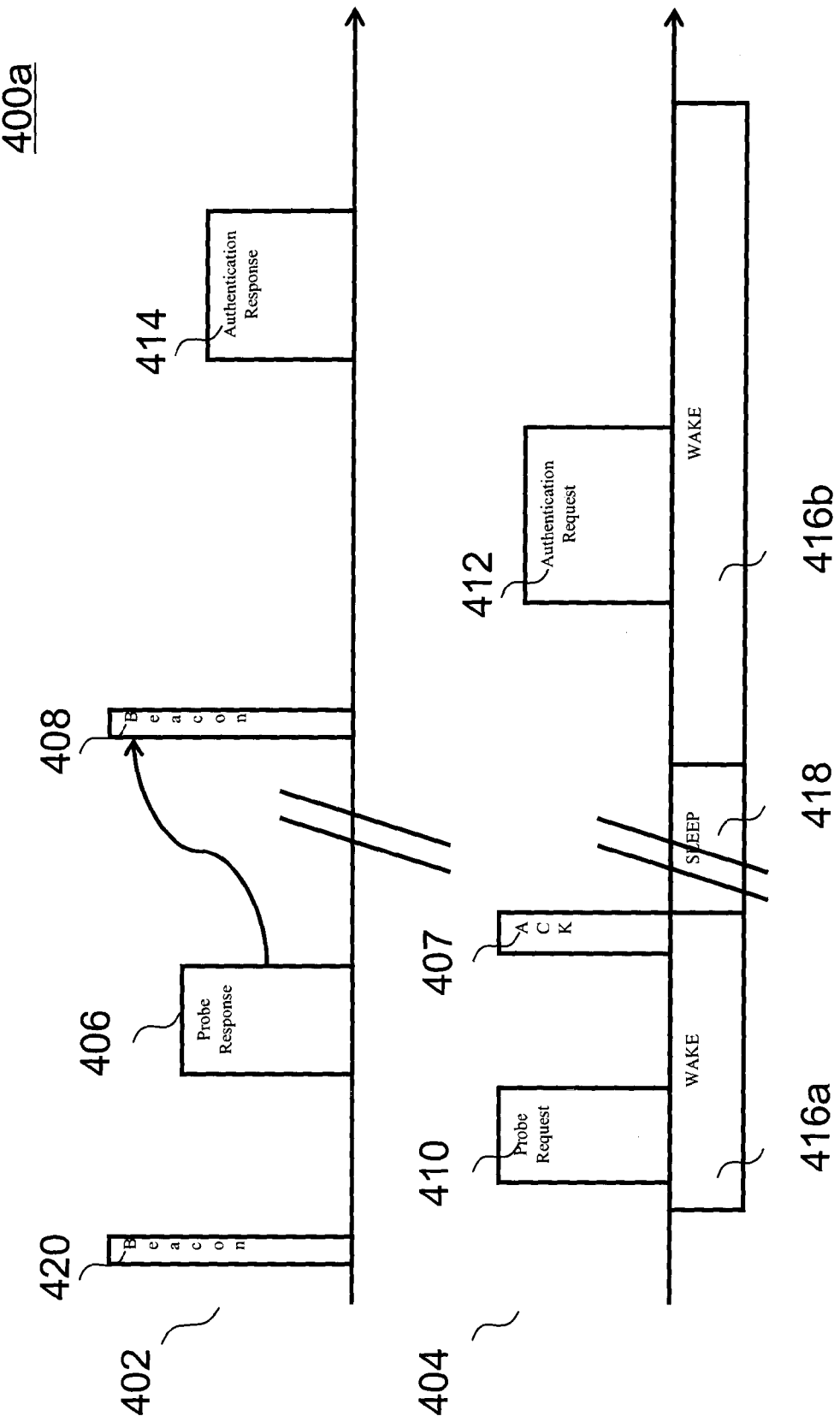
FIG. 4A is a schematic showing a method to establish communication between an access point and a station according to various embodiments.

FIG. 4A is a schematic 400a showing a method to establish communication between an access point 402 and a station 404 according to various embodiments.

In various embodiments, the first signal 406 is a probe response signal. The second signal 408 may be a beacon signal. The first signal 406 may be transmitted by the AP 402 after the AP 402 receives a probe request signal 410 transmitted by the station 404. The second signal 408 may be one signal of a prescheduled series of periodic signals 420, 408. The series of periodic signals 420, 408, including the second signal 408, may be transmitted to all the stations within the vicinity of the AP 402. Broadcasting the second signal 408, instead of responding to the probe request signal by each station individually, may improve channel efficiency.

The second signal 408 may include a value. The value may be may be randomly generated by the AP 402. The station 404 may generate a filter. The station 404 may determine whether to send a linking signal (e.g. an authentication request signal or an association request signal) to the AP 402 based on whether the value falls within the range of values of the filter. Various embodiments may limit the number of stations carrying out association or authentication concurrently at a point in time.

The AP 402 may determine a time period. The time period may be a duration from the transmitting of the first signal 406 from the access point 402 and transmitting of the second signal 408 from the access point 406. In other words, the time period may be the time to the prescheduled transmitting of the beacon signal 408.

The AP 402 may transmit the first signal 406 to the station 404. The first signal 406 may include information indicating a time period. The AP 402 may further process a second signal 408 upon expiry of the time period. Processing the second signal 408 may include transmitting the second signal 408 to the station 404.

The station 404 may be in an awake mode 416*a* to transmit the probe request signal 406 to the AP 402. The station 404 may be in the awake mode 416*a* to receive the first signal 406 from the AP 402. The station 404 may not be in the awake mode 416*a* to receive the signal 420. The station 404 may be deactivated after receiving the first signal 406 and before expiry of the time period. The station 404 may be deactivated after the station 404 transmits an acknowledgment signal 407. The acknowledgment signal 407 may be transmitted from the station 404 to the AP 402. In other words, the station 404 may go into an asleep mode or a doze mode 418 after receiving the first signal 406 and before expiry of the time period. The station 404 may be activated upon expiry of the time period. In other words, the station 404 may go into an awake mode 416*b*. The station 404 may be activated upon expiry of the time period to receive the second signal 408.

There may be one or more additional beacon signals between the first signal 406 and the second signal 408. In other words, there may more than one beacon interval between the first signal 406 and the second signal 408.

The second signal 408 may include an indication for the station 404 to transmit an authentication request signal 412. On receiving the authentication request signal 412, the AP 402 may transmit an authentication response signal 414.

Figure 4B:
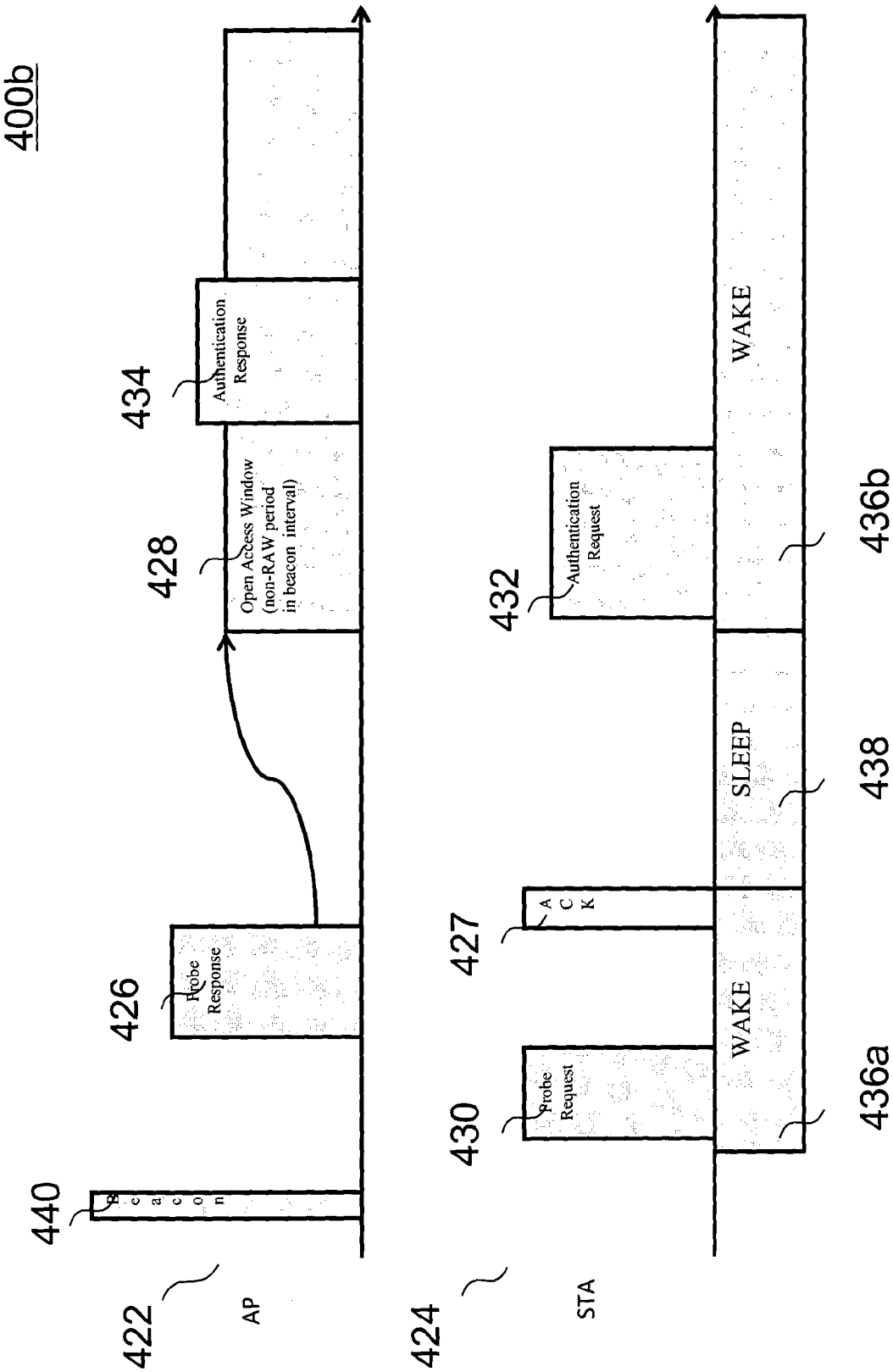
FIG. 4B is another schematic showing a method to establish communication between an access point and a station according to various embodiments.

FIG. 4B is a schematic 400*b* showing a method to establish communication between an access point 422 and a station 424 according to various embodiments.

The AP 422 may determine a time period. The time period may be a duration from the transmitting of the first signal 426 to a predetermined time within or at the start of the Open Access Window 428.

In various embodiments, there may be time intervals in the AP 402 may have Restrict Access Window (RAW). The station 404 may not initiate authentication or association procedures during the RAW time intervals. Various embodiments provide a way to defer authentication or association procedures between a station and the AP without affecting the RAW time intervals.

The AP 422 may transmit the first signal 426 to the station 424. The first signal 426 may include information indicating a time period. The AP 422 may further process a second signal 432 upon expiry of the time period. The station 424 may be deactivated after the station 424 transmits an acknowledgment signal 427. The acknowledgment signal 427 may be transmitted from the station 424 to the AP 422. Processing the second signal 432 may include receiving the second signal 432 from the station 424.

The station may be in an awake mode 436*a* to transmit the probe request signal 426 to the AP 422. The station may be in the awake mode 436*a* to receive the first signal 426 from the AP 422. The station 424 may be deactivated after receiving the first signal 426 and before expiry of the time period. In other words, the station 424 may go into an asleep mode or a doze mode 438 after receiving the first signal 426 and before expiry of the time period. The station 424 may be activated upon expiry of the time period. In other words, the station 424 may go into an awake mode 436*b*. The station 424 may be activated upon expiry of the time period to transmit the second signal 432 to the AP 422. The second signal 432 may be an authentication request signal.

On receiving the authentication request signal 432, the AP 422 may transmit an authentication response signal 434. The AP 422 may also transmit periodic beacon signals 440. The station 424 may not be in an awake mode 436*a* to receive the periodic beacon signals 440.

Figure 4C:
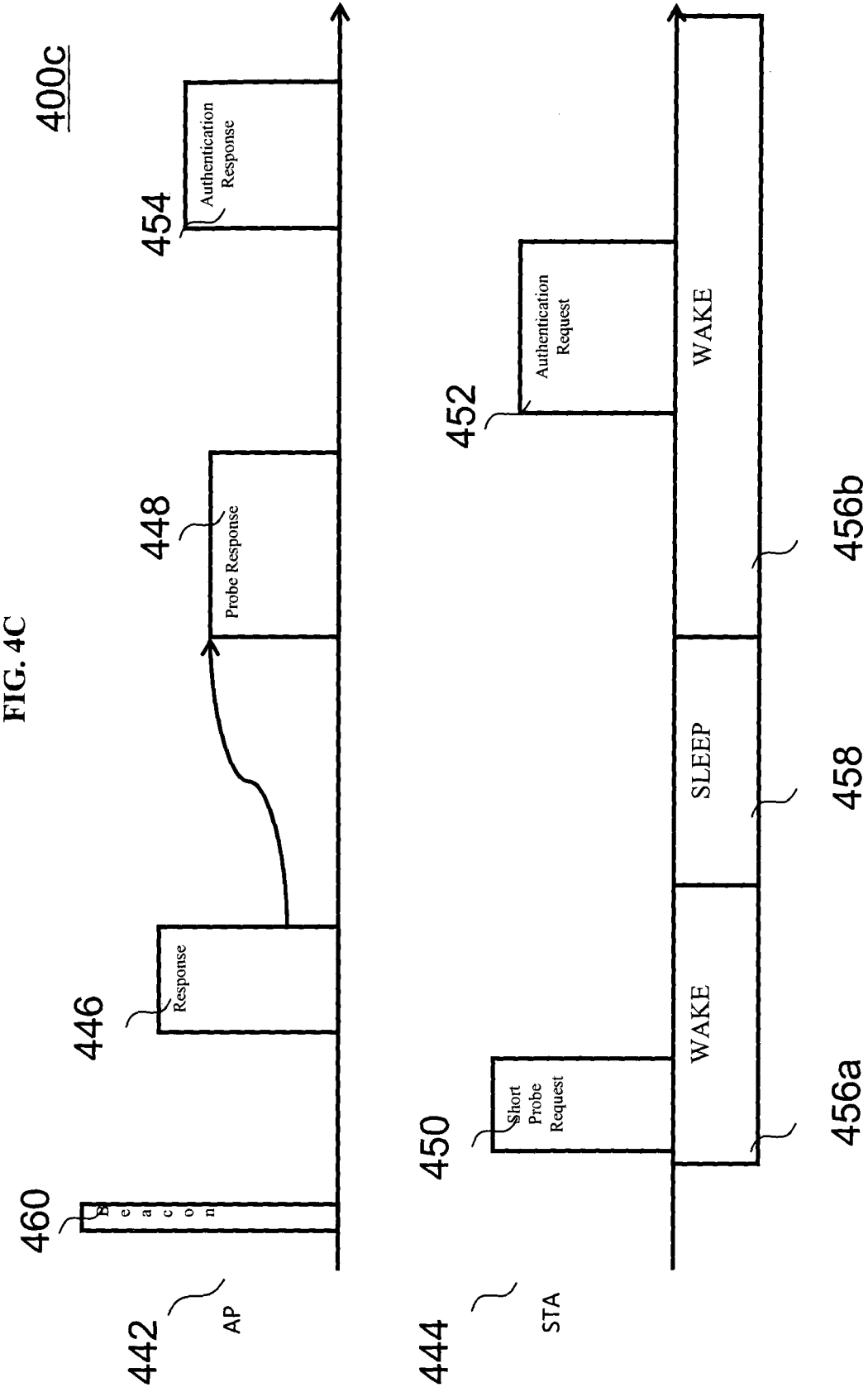
FIG. 4C is another schematic showing a method to establish communication between an access point and a station according to various embodiments.

FIG. 4C is a schematic 400*c* showing a method to establish communication between an access point 442 and a station 444 according to various embodiments.

In various embodiments, the first signal 446 is a probe response signal. The second signal 448 may be a probe response signal. The first signal 446 may be transmitted by the AP 442 after the AP 442 receives a probe request signal 450 (e.g. a short probe request signal) transmitted by the station 444. The probe request signal 450 may not be a scheduled signal or one signal of a series of scheduled signals. The probe request signal may be separate from beacon signal 460.

The AP 442 may determine a time period. The time period may be a duration from the transmitting of the first signal 446 from the access point 442 and transmitting of the second signal 448 from the access point 446. In other words, the time period may be the time to the prescheduled transmitting of the signal 448.

The AP 442 may transmit the first signal 446 to the station 444. The first signal 446 may include information indicating a time period. The AP 442 may further process a second signal 448 upon expiry of the time period. Processing the second signal 448 may include transmitting the second signal 448 to the station 444.

The station 444 may be in an awake mode 456*a* to transmit the probe request signal 446 to the AP 442. The station 444 may not be in the awake mode 456*a* to receive the beacon signal 460. The station 444 may be in the awake mode 456*a* to receive the first signal 446 from the AP 442. The station 444 may be deactivated after receiving the first signal 446 and before expiry of the time period. In other words, the station 444 may go into an asleep mode or a doze mode 458 after receiving the first signal 446 and before expiry of the time period. The station 444 may be activated upon expiry of the time period. In other words, the station 444 may go into an awake mode 456*b*. The station 444 may be activated upon expiry of the time period to receive the second signal 448.

The second signal 448 may include an indication for the station 404 to transmit an authentication request signal 452. On receiving the authentication request signal 452, the AP 442 may transmit an authentication response signal 454.

Various embodiments may spread out initialization of the authentication or association procedures to limit the number of stations carrying out the authentication or association procedures at a time.

The probe response signals or authentication (request or response) signals or association (request or response) signals of different stations may be spread to different beacon intervals. Various embodiments may reduce contention between stations.

The probe request signal may include one or more bits to indicate priority to be given to the probe request signal or STA. For instance, the AP may transmit a first signal including information indicating a time period in response to a low priority probe request signal or a probe request signal from a low priority STA. The time period may vary inversely with the priority of the probe request signal or STA, with a greater time period (i.e. greater delay) allocated to lower priority probe request signals or probe request signals from a lower priority STA.

The AP may send a signal for initializing authentication or association procedures immediately for high priority probe request signals or probe request signals from high priority STAs.

The AP may allocate channel access time to complete authentication or association procedures for high priority robe request signals or probe request signals from high priority STAs. Authentication or association procedures may be carried out through Clear To Send (CTS)-to-self or Null Data Packet (NDP)-Clear To Send (CTS) addressed to high priority STAs.

Figure 5A:
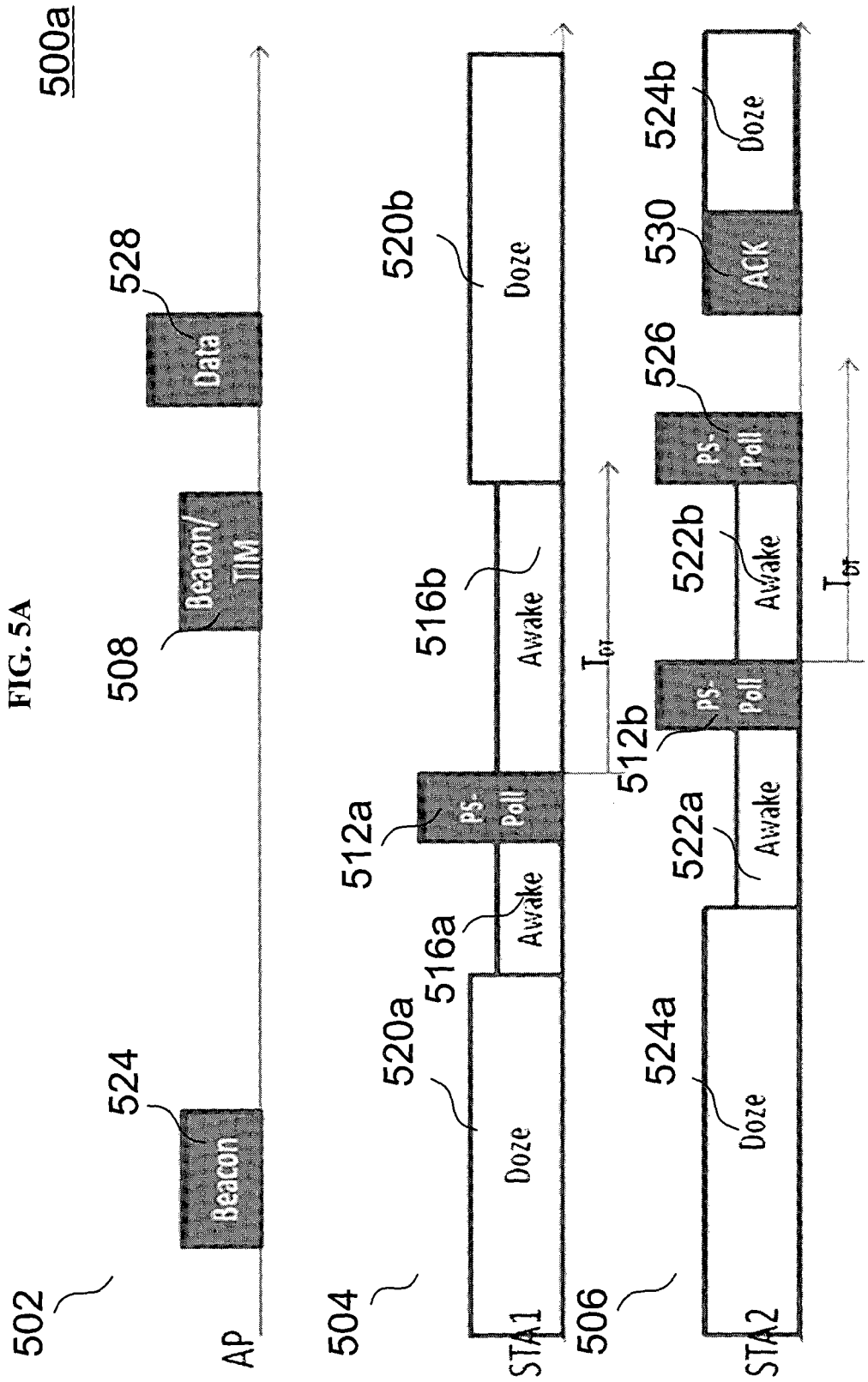
FIG. 5A is a schematic showing a method of communication between an access point and a station STA1 according to various embodiments and between an access point and a station STA2 according to various embodiments.

FIG. 5A is a schematic 500a showing a method of communication between an access point 502 and a station STA1 504 according to various embodiments and between an access point and a station STA2 506 according to various embodiments. FIG. 5A also shows a method of controlling an access point 502 and a method for controlling a station 504, 506.

A method of controlling an access point is provided. The method includes receiving a prior polling signal 512a, 512b from a station 504, 506. The method further includes transmitting information in a first signal 508 if a time period from receiving the prior polling signal 512a, 512b to transmitting the first signal 508 is less than a predetermined duration. The method further includes receiving a further prior polling signal from the station 504, 506 otherwise.

The first signal 508 may be one signal of a prescheduled series of signals. The first signal 508 may be one signal of a prescheduled series of periodic signals.

In various embodiments, the first signal 508 may include information indicating a time period. A station 504, 506 receiving the first signal 508 may deactivate after receiving the first signal 508 and before expiry of the time period. The station 504, 506 may be activated upon expiry of the time period. The first signal 508 may not include the time period.

The first signal may include an indication whether there is buffered data stored in the AP 502 for the station 504, 506. When the first signal 508 includes the indication that there is buffered data stored in the AP 502 for the station 504, 506, the first signal 508 may also include information indicating the time period. Alternatively, when the first signal 508 includes the indication that there is no buffered data stored in the AP 502 for the station 504, 506, the first signal 508 may not include information indicating the time period.

Receiving the further prior polling signal from the station 504, 506 includes waiting for the station 504, 506 to transmit the further prior polling signal. Waiting for the station 504, 506 to transmit the further prior polling signal includes waiting for the station 504, 506 to deactivate and activate to transmit the further prior polling signal.

The method may further include transmitting the first signal 508 if a time period from receiving the further prior polling signal to transmitting the first signal 508 is less than the predetermined duration. Otherwise, the AP 502 may wait for further prior polling signals. In this manner, the AP 502 may receive further prior polling signals until the first signal is transmitted.

The first signal 508 may include a TIM or a TIM segment.

A method of controlling a station is also provided. The method includes transmitting a prior polling signal 512a, 512b to an access point 502. The method may further include receiving information transmitted in a first signal 508 if a time period from transmitting the prior polling signal 512a, 512b to receiving the first signal 508 is less than a predetermined duration. The method further includes transmitting a further prior signal to the access point 502 otherwise.

The first signal 508 may be one signal of a prescheduled series of signals 508, 524. The first signal 508 may be one signal of a prescheduled series of periodic signals 508, 524.

The predetermined duration may be based on the number of polling signals received by the AP 502. The predetermined duration may be based on an average delay from transmitting a signal and receiving a response signal in response to the signal by all stations within a vicinity of the AP 502. The predetermined duration may be agreed by the station 504, 506 and the AP 502 during authentication/association procedures or other procedures or other management frame transmissions between the 504, 506 and the AP 502.

Transmitting the further prior signal to the access point 502 includes deactivating the station 504, 506 and activating the station 504, 506 to transmit the further prior polling signal to the access point.

The method may further include receiving information transmitted in a first signal 508 if a time period from transmitting the further prior polling signal to receiving the first signal 508 is less than a predetermined duration. Otherwise, subsequent prior polling signals may be transmitted from the stations 504, 506 until a first signal is received by the AP.

The first signal 508 may include a TIM or a TIM segment.

The station 504, 506 may be in an asleep mode or doze mode 520a, 524a. The station may be activated, i.e. changed from the sleep mode or doze mode 520a, 524a to an awake mode 516a, 522a. The station 504, 506 may transmit a prior polling signal 512a, 512b. The duration for the awake mode 516a, 522a after activation and before transmitting of the prior polling signal 512a, 512b may be zero or a finite value. In other words, the prior polling signal 512a, 512b may be transmitted immediately after activation or after a finite period of time from activation. If a time period from receiving the prior polling signal 512a, 512b to transmitting a first signal 508 is less than a predetermined duration, the first signal 508 may be transmitted from an AP 502 to the station 504, 506. Otherwise, the AP 502 may wait to receive a further prior polling signal from the station 504, 506. In other words, when the time taken to transmit the first signal 508 from receiving the prior polling signal 512a, 512b exceeds the predetermined value, the transmitting of the first signal 508 may timeout. The AP 502 may then wait to receive a further prior polling signal from the station 504, 506. The station may remain in an awake mode 516b, 522b before expiry of the predetermined duration from transmitting of the prior polling signal 512a, 512b. The first signal may include TIM that indicates that there is no buffered data stored in the AP for the station 504. The station 504 may be deactivated, i.e. go into an asleep mode or a doze mode 520b. The first signal may include TIM that indicates that there is buffered data stored in the AP for the station 506.

The first signal 508 may include an indication for the station 506 to transmit a subsequent polling signal 526. The AP 502 may receive the subsequent polling signal 526. The AP may then transmit data signal 528. The station 506 may then receive the data signal 528. The station 506 may then transmit an acknowledgement signal 530 and then go into an asleep mode or doze mode 524b.

Figure 5B:
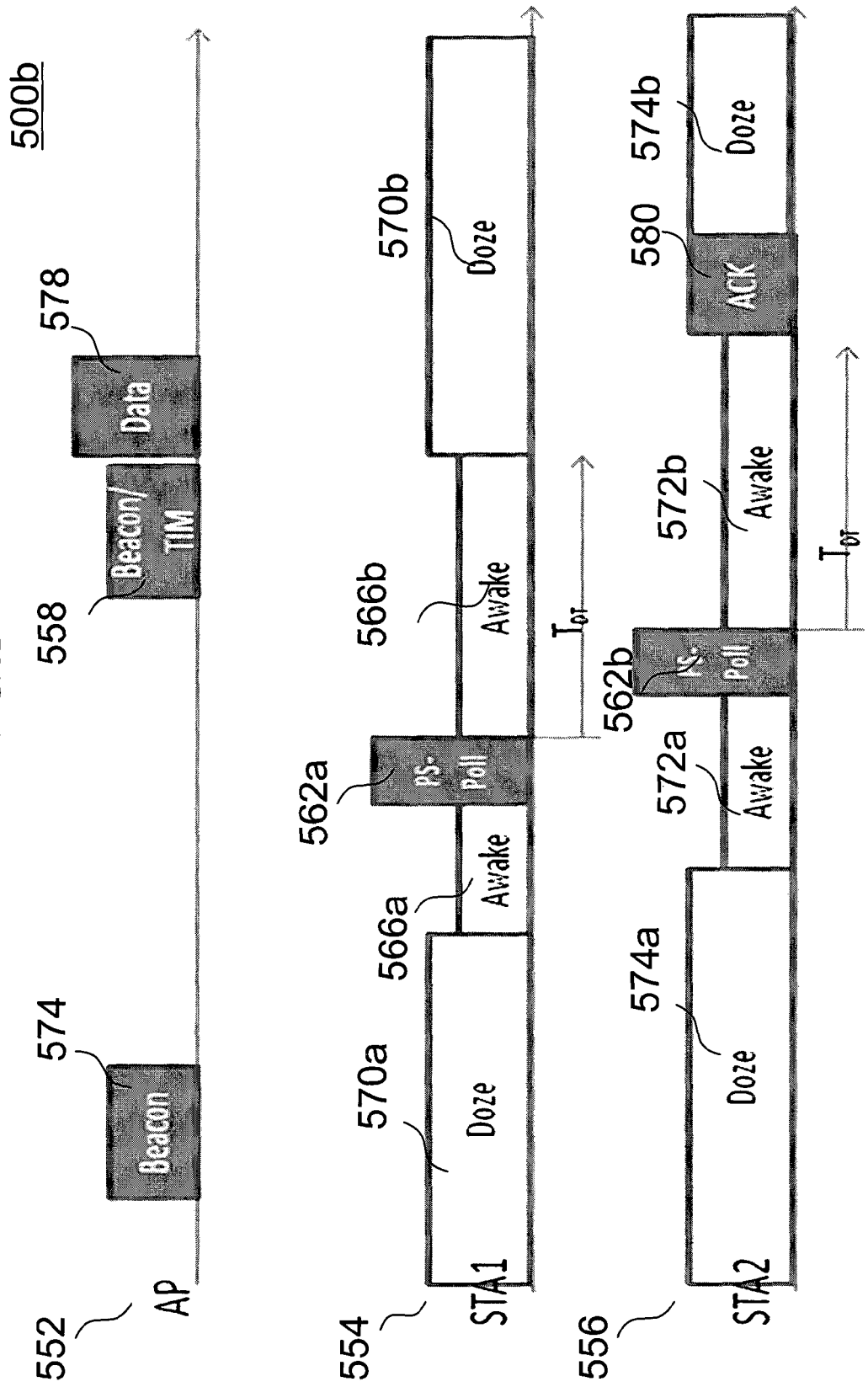
FIG. 5B is another schematic showing a method of communication between an access point and a station STA1 according to various embodiments and between an access point and a station STA2 according to various embodiments.

FIG. 5B is a schematic showing a method of communication between an access point 552 and a station STA1 554 according to various embodiments and between an access point and a station STA2 556 according to various embodiments. FIG. 5B also shows a method of controlling an access point 552 and a method for controlling a station 554, 556.

The station 554, 556 may be in an asleep mode or doze mode 570a, 574a. The station may be activated, i.e. changed from the sleep mode or doze mode 570a, 574a to an awake mode 566a, 572a. The station 554, 556 may transmit a prior polling signal 562a, 562b. The duration for the awake mode 566a, 572a after activation and before transmitting of the prior polling signal 462a, 462b may be zero or a finite value. In other words, the prior polling signal 562a, 562b may be transmitted immediately after activation or after a finite period of time from activation. If a time period from receiving the prior polling signal 562a, 562b to transmitting a first signal 558 is less than a predetermined duration, the first signal 558 may be transmitted from an AP 552 to the station 554, 556. Otherwise, the AP 552 may wait to receive a further prior polling signal from the station 554, 556. In other words, when the time taken to transmit the first signal 558 from receiving the prior polling signal 562a, 562b exceeds the predetermined value, the transmitting of the first signal 558 may timeout. The AP 552 may then wait to receive a further prior polling signal from the station 554, 556. The station may remain in an awake mode 566b, 572b before expiry of the predetermined duration from transmitting of the prior polling signal 562a, 562b. The first signal 558 may include TIM that indicates that there is no buffered data stored in the AP for the station 554. The station 554 may be deactivated, i.e. go into an asleep mode or a doze mode 562b. The first signal 558 may include TIM that indicates that there is buffered data stored in the AP for the station 556. The first signal 558 may be one signal of a prescheduled series of signals 574, 558. The first signal 558 may be one signal of a prescheduled series of periodic signals 574, 558. The first signal 558 may include an indication for the station 506 to remain in the awake mode 572b. The AP may then transmit data signal 578. The station 506 may then receive the data signal 578. The station 556 may then transmit an acknowledgement signal 580 and then go into an asleep mode or doze mode 574b.

Figure 6A:
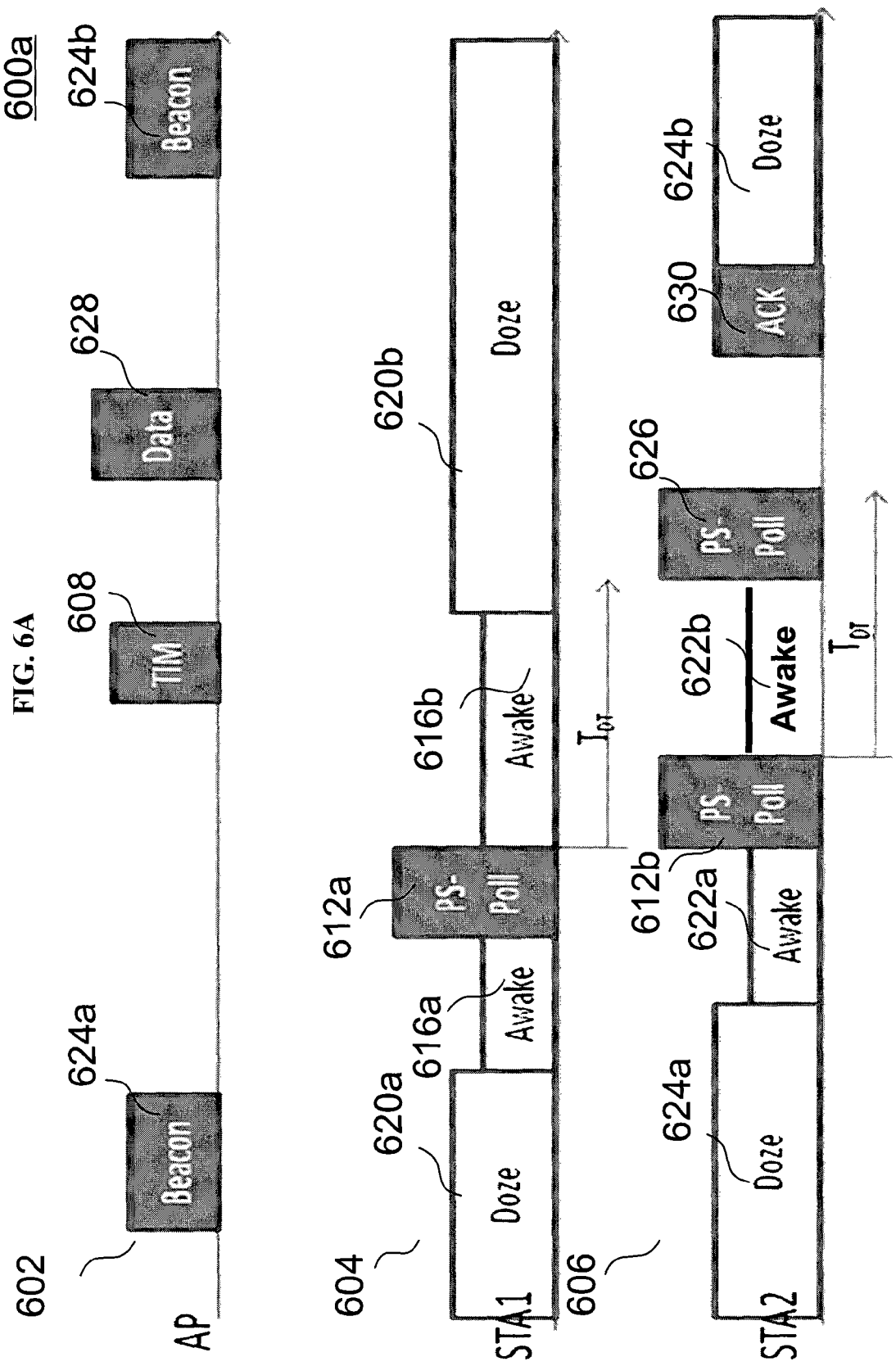
FIG. 6A is another schematic showing a method of communication between an access point and a station STA1 according to various embodiments and between an access point and a station STA2 according to various embodiments.

FIG. 6A is a schematic showing a method of communication between an access point 602 and a station STA1 604 according to various embodiments and between an access point and a station STA2 606 according to various embodiments. FIG. 6A also shows a method of controlling an access point 602 and a method for controlling a station 604, 606.

A method of controlling an access point is provided. The method includes receiving a prior polling signal 612a, 612b from a station 604, 606. The method further includes transmitting information in a first signal 608 if a time period from receiving the prior polling signal 612a, 612b to transmitting the first signal 608 is less than a predetermined duration. The method further includes receiving a further prior polling signal from the station 604, 606 otherwise.

The station 604, 606 may be in an asleep mode or doze mode 620a, 624a. The station may be activated, i.e. changed from the sleep mode or doze mode 620a, 624a to an awake mode 616a, 622a. The station 604, 606 may transmit a prior polling signal 612a, 612b. The duration for the awake mode 616a, 622a after activation and before transmitting of the prior polling signal 612a, 612b may be zero or a finite value. In other words, the prior polling signal 612a, 612b may be transmitted immediately after activation or after a finite period of time from activation. If a time period from receiving the prior polling signal 612a, 612b to transmitting a first signal 608 is less than a predetermined duration, the first signal 608 may be transmitted from an AP 602 to the station 604, 606. Otherwise, the AP 602 may wait to receive a further prior polling signal from the station 604, 606. In other words, when the time taken to transmit the first signal 608 from receiving the prior polling signal 612a, 612b exceeds the predetermined value, the transmitting of the first signal 608 may timeout. The AP 602 may then wait to receive a further prior polling signal from the station 604, 606. The station may remain in an awake mode 616b, 622b before expiry of the predetermined duration from transmitting of the prior polling signal 612a, 612b. The first signal may include TIM that indicates that there is no buffered data stored in the AP for the station 604. The station 604 may be deactivated, i.e. go into an asleep mode or a doze mode 620b. The first signal 608 may include TIM that indicates that there is buffered data stored in the AP for the station 606. The first signal 608 may be transmitted in response to a prior polling signal transmitted to one or more STAs 604, 606 of a plurality of STAs 604, 606. The first signal 608 may be transmitted to more than one stations of the plurality of STA (multicast) or all stations of the plurality of STAs (broadcast). The first signal 608 may be a prescheduled signal. The method may include sending a second signal if the time period from receiving the prior polling signal 612a, 612b to transmitting the first signal 608 is more than or equal than a predetermined duration. The second signal may be a non-prescheduled signal. The first signal 608 may include an indication for the station 606 to transmit a subsequent polling signal 626. The AP 602 may receive the subsequent polling signal 626. The AP may then transmit data signal 628. The station 606 may then receive the data signal 628. The station 606 may then transmit an acknowledgement signal 630 and then go into an asleep mode or doze mode 624b.

Figure 6B:
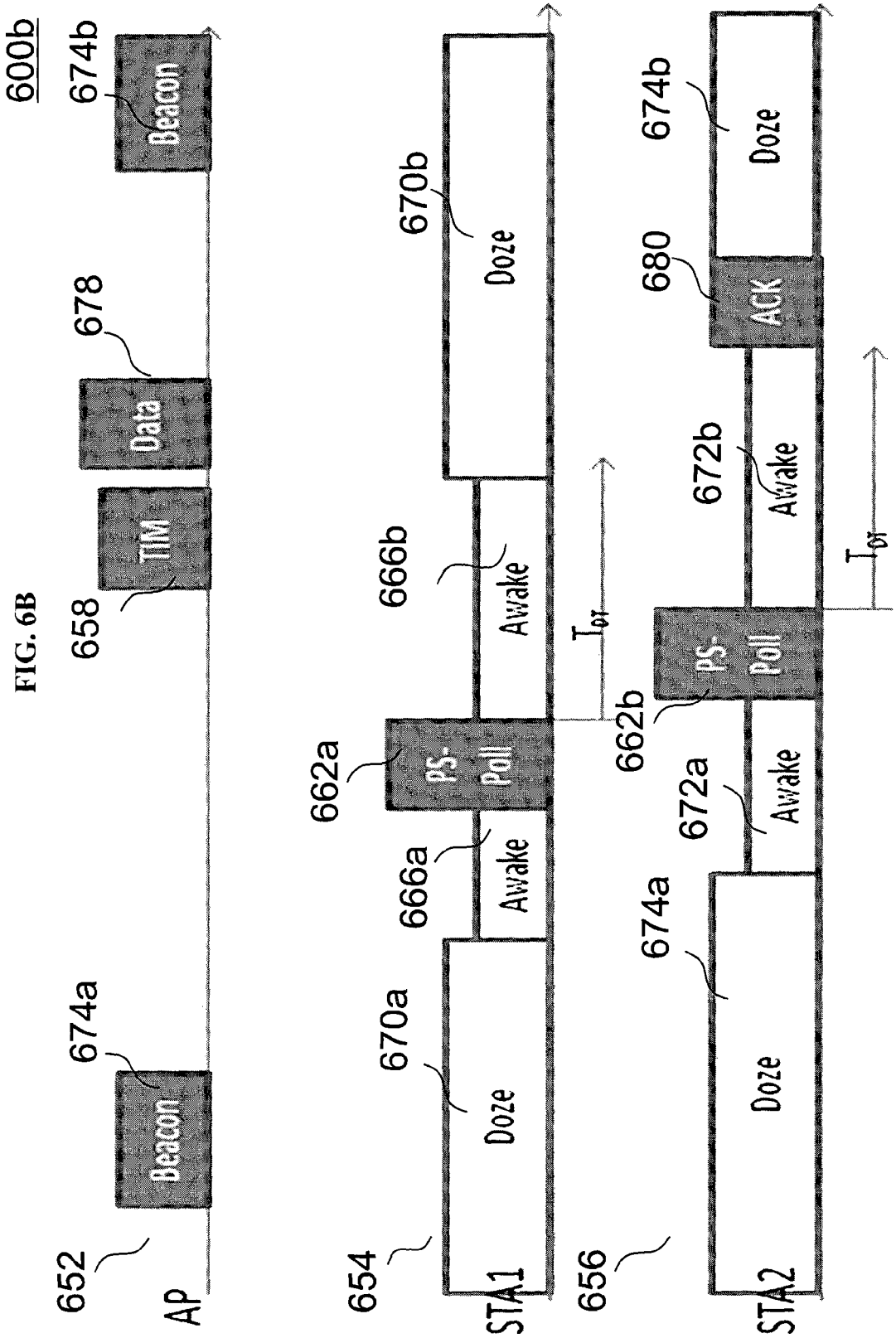
FIG. 6B is another schematic showing a method of communication between an access point and a station STA1 according to various embodiments and between an access point and a station STA2 according to various embodiments.

FIG. 6B is a schematic showing a method of communication between an access point 652 and a station STA1 654 according to various embodiments and between an access point and a station STA2 656 according to various embodiments. FIG. 6B also shows a method of controlling an access point 652 and a method for controlling a station 654, 656.

The station 654, 656 may be in an asleep mode or doze mode 670a, 674a. The station may be activated, i.e. changed from the sleep mode or doze mode 670a, 674a to an awake mode 666a, 672a. The station 654, 656 may transmit a prior polling signal 662a, 662b. The duration for the awake mode 666a, 672a after activation and before transmitting of the prior polling signal 662a, 662b may be zero or a finite value. In other words, the prior polling signal 662a, 662b may be transmitted immediately after activation or after a finite period of time from activation. If a time period from receiving the prior polling signal 662a, 662b to transmitting a first signal 658 is less than a predetermined duration, the first signal 658 may be transmitted from an AP 652 to the station 654, 656. Otherwise, the AP 652 may wait to receive a further prior polling signal from the station 654, 656. In other words, when the time taken to transmit the first signal 658 from receiving the prior polling signal 662a, 662b exceeds the predetermined value, the transmitting of the first signal 658 may timeout. The AP 652 may then wait to receive a further prior polling signal from the station 654, 656. The station may remain in an awake mode 666*b*, 672*b* before expiry of the predetermined duration from transmitting of the prior polling signal 662*a*, 662*b*. The first signal 658 may include TIM that indicates that there is no buffered data stored in the AP for the station 654. The station 654 may be deactivated, i.e. go into an asleep mode or a doze mode 662*b*. The first signal 658 may include TIM that indicates that there is buffered data stored in the AP for the station 656. The first signal 658 may be transmitted in response to a prior polling signal transmitted to one or more STAs 654, 656 of a plurality of STAs 654, 656. The first signal 658 may be transmitted to more than one stations of the plurality of STA (multicast) or all stations of the plurality of STAs (broadcast). The first signal 658 may be a prescheduled signal. The method may include sending a second signal if the time period from receiving the prior polling signal 662*a*, 662*b* to transmitting the first signal 658 is more than or equal than a predetermined duration. The second signal may be a non-prescheduled signal. The first signal 658 may include an indication for the station 656 to remain in the awake mode 672*b*. The AP may then transmit data signal 678. The station 606 may then receive the data signal 678. The station 656 may then transmit an acknowledgement signal 680 and then go into an asleep mode or doze mode 674*b*.

Upon receiving a prior polling signal or a subsequent polling signal, the AP may determine whether to send a data signal. The AP may determine to transmit a data signal including buffered data if there is buffered data stored in the AP. The buffered data stored in the AP may be for the STA transmitting the prior polling signal or subsequent polling signal.

The AP may also determine to transmit a control signal or an acknowledgement signal. The control signal or acknowledgement signal may include a Buffered Unit (BU). The Buffered Unit (BU) bit may use the More Data sub field under the Frame Control field. The Buffered Unit (BU) bit may be set as 1 or 0 depending on whether there is buffered data stored in the AP.

The AP may instead determine to transmit a signal (such as a control signal e.g. a beacon signal) including information indicating a time period. The signal may include a TIM or a TIM segment. The signal may be transmitted if a time period from receiving the prior polling signal to transmitting the first signal is less than a predetermined duration ($T_{DT}$).

The AP may alternately determine to transmit a signal in response to a prior polling signal transmitted to one or more STAs of a plurality of STA. The signal may be transmitted to more than one STAs of the plurality of STA (multicast) or all STAs of the plurality of STAs (broadcast). The signal may include a TIM or a TIM segment. The signal may be transmitted if a time period from receiving the prior polling signal to transmitting the first signal is less than a predetermined duration ($T_{DT}$).

The AP may also determine to transmit a signal in response to a prior polling signal transmitted to one or more STAs of a plurality of STA. The signal may include information indicating a time period. The STA may deactivate after receiving the first signal and before expiry of the time period. The station may be activated upon expiry of the time period. The station may be activated upon expiry of the time period to receive a second signal from the AP. The second signal may include a TIM or a TIM segment.

The AP may also determine or calculate the number of stations that have transmitted and/or is going to transmit a polling signal. The AP may also determine or calculate the number of stations waiting for signals including TIM or TIM segments.

When a station receives a data signal from an AP, it may determine to transmit an acknowledgement signal to the AP.

An acknowledgement signal received by a STA may include an indication on whether there is buffered data stored in the AP for the STA. If there is indication that there is buffered data stored in the AP for the STA, the STA may stay awake to receive the data signal or transmit a subsequent polling signal to indicate to the AP to transmit the data signal. If there is indication that there is buffered data stored in the AP for the STA, the STA may deactivate (i.e. go into a sleep mode or a doze mode).

The STA may receive information transmitted in a first signal within a predetermined duration from transmitting a prior polling signal. The first signal may include a TIM or a TIM segment. The first signal may be a beacon signal, a TIM broadcast or multicast signal or a control signal. The prior polling signal may include a trigger signal or a trigger frame. The prior polling signal may also include a prior PS-Poll signal or a prior PS-Poll frame.

The STA may also include a first signal indicating a time period. The STA maybe deactivated after receiving the first signal but before expiry of the time period. The STA may be activated upon expiry of the time period. The STA may be activated upon expiry of the time period to receive a second signal from the AP. The first signal may be an acknowledgement signal, a beacon signal, a TIM signal or any other response signals.

The STA may be deactivated upon expiry of the predetermined duration from transmitting a prior polling signal. The STA may transmit a further prior polling signal. The STA may go into an sleep mode or a doze mode, i.e. be activated. The STA may be deactivated and be activated prior to transmitting a further polling signal.

A polling signal such as a prior polling signal may include the predetermined duration or information indicating the predetermined duration. Various embodiments may facilitate the AP to determine whether to send an acknowledgement signal, a signal including information indicating a time period, a signal including a TIM or a TIM segment or any other response signals.

Figure 7:
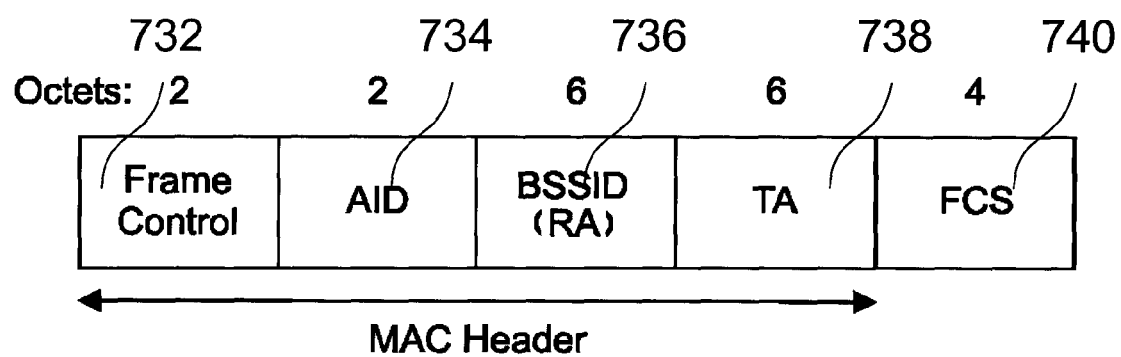
FIG. 7 is a schematic showing the frame format for a polling signal according to various embodiments.

FIG. 7 is a schematic 700 showing the frame format for a polling signal according to various embodiments. The polling signal may include a frame control field 732 (2 octets), a AID field 734 (2 octets), a BBSID (RA) field 736 (2 octets), a TA field 738 (2 octets) and a FCS field 740 (2 octets).

In various embodiments, the AID field 734 may be used to include the predetermined duration or information indicating the predetermined duration. Some bits of the AID field may not be used to indicate the AID of the STAs. 13 bits of the AID field may be sufficient to indicate the AIDs for 6000 STAs.

In various embodiments, the TA field 738 may be used to include the predetermined duration or information indicating the predetermined duration. The most significant bit (MSB) of the TA field 738 may be set to indicate that the TA field is not used to indicate the transmitting station address. In various embodiments, the AID field 734 and the TA field 738 may be used to include the predetermined duration or information indicating the predetermined duration.

In various embodiments, the polling signal may be modified to include the predetermined duration. A timeout duration field may be inserted between the TA field and the FCS field. Under IEEE standard 802.11-2007, control subtypes 0000-0111 may be reserved. Any one of the reserved control subtypes may be used for the new control message.

Figure 8:
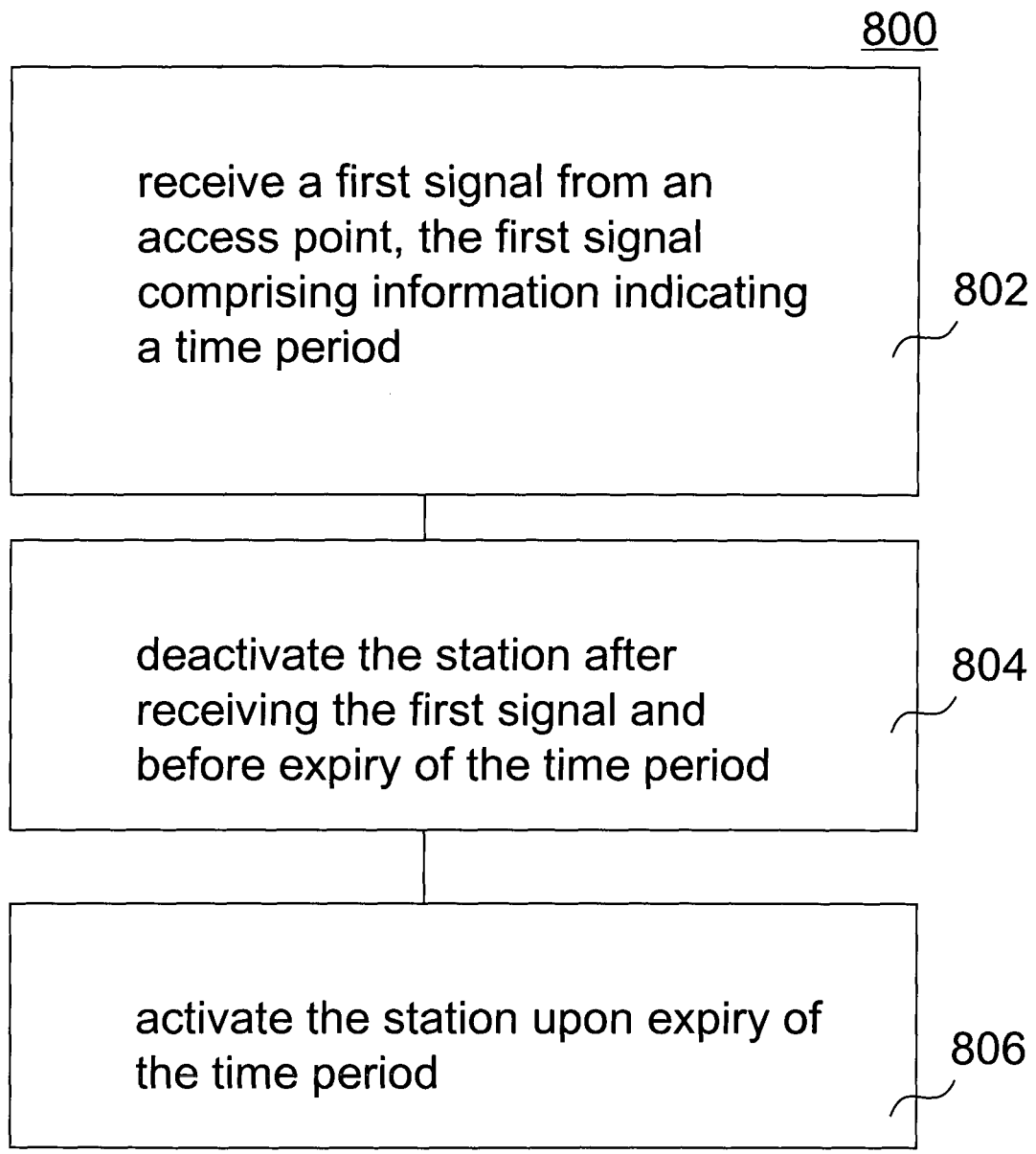
FIG. 8 is a schematic showing a method of controlling a station according to various embodiments.

FIG. 8 is a schematic 800 showing a method of controlling a station according to various embodiments. The method may provide, in 802, receiving a first signal from an access point, the first signal including information indicating a time period. The method may further provide, in 804, deactivating the station after receiving the first signal and before expiry of the time period. The method may also provide, in 806, activating the station upon expiry of the time period.

In other words, the method may include receiving a first signal from an access point. The signal may indicate a time period. The station may be required to be in an awake mode at the end of the time period. The station may go to an asleep mode after receiving the first signal and switch to the awake mode by the end of the time period.

In various embodiments, the station may be activated upon expiry of the time period to receive a signal from an access point. Receiving the signal may include processing the signal.

The second signal may be one signal of a prescheduled series of signals. The second signal may be one signal of a prescheduled series of periodic signals. The second signal may be one beacon signal of a prescheduled series of periodic beacon series. In other words, the time interval between consecutive beacon signals may be equal.

The time period may be indicated by a duration between transmitting of the first signal from the access point and transmitting of the second signal from the access point. The time period may alternatively be indicated by a duration between transmitting of the first signal from the access point to a predetermined time interval such as an Open Access Window.

In various embodiments, the second signal may include an indication for the station to be awake to receive a data signal. Receiving the data signal may include processing the data signal.

In various embodiments, the second signal may include an indication on whether there is buffered data stored in the access point for the station.

The second signal may include a Traffic Indication Map (TIM) or a Traffic Indication Map (TIM) segment. An indication on whether there is buffered data stored in the access point for the station may include a TIM bit for the station.

The second signal may include buffered data. In other words, the second signal may be a data signal. The buffered data may be stored in the access point for the station.

The second signal may include an indication for the station to transmit a subsequent polling signal to the access point.

The second signal may be a beacon signal or an authentication request signal or a probe response signal.

The method may further include transmitting the subsequent polling signal to the access point. The method may also include receiving a data signal including buffered data from the access point. Receiving the data signal may include processing the data signal.

In various embodiments, the station may be activated upon expiry of the time period to transmit a second signal to the access point.

The time period may be determined by the access point. In various embodiments, the time period may be determined by the number of stations in the vicinity of the access point, or current network traffic experienced by the access point or past average network traffic processed by the access point.

In various embodiments, the method may further include transmitting a prior polling signal to the access point. The prior polling signal may include a trigger signal or a trigger frame such as DATA NULL, QoS (Quality of Service) NULL. The prior polling signal may be a probe request. The prior polling signal may also include a prior PS-Poll signal or a prior PS-Poll frame or a prior NDP PS-Poll frame. A PS-Poll signal or a PS-Poll frame may be used by a STA to query an AP whether there is buffered frame for the STA. A trigger frame may be used by a STA to inform an AP that the STA has some information to transmit to the AP.

The first signal may include an indication whether there is buffered data stored in the AP for the station. When the first signal includes the indication that there is buffered data stored in the AP for the station the first signal may also include information indicating the time period. Alternatively, when the first signal includes the indication that there is no buffered data stored in the AP for the station, the first signal may not include information indicating the time period. The first signal may be a NDP ACK signal or a NDP ACK frame including information indicating a time period. The first signal may be a beacon signal including information indicating a time period. The first signal may be an ACK signal or an ACK frame including information indicating a time period. The first signal may be a probe response signal.

In various embodiments, a station may be a low power station. The low power station may be a non-TIM station. A non-TIM station may be a station that may not be configured to receive a signal including a TIM or a TIM segment. On the other hand, a TIM station may be a station configured to receive a signal including a TIM or a TIM segment. In various embodiments, the AP may be configured to treat a non-TIM station as a TIM station temporarily. The non-TIM station may be switched to a paged station temporarily. A non-TIM station may be configured to temporarily receive beacon signals including beacon signals including a TIM or a TIM segment. A STA may send a prior polling signal such as a PS-Poll frame or a trigger frame any time to its associated AP upon waking up without listening to the beacon signal. The low power STA may be a non-TIM STA. Upon receiving the prior polling signal such as a PS-Poll frame or a trigger frame, the AP may transmit a first signal such as a control frame including information indicating a time period (such as a timer). The control frame may include a NDP ACK frame or a NDP modified ACK frame. The control frame may include a Duration field to indicate that a time period is present (such as setting a Duration Indication field to 1). The STA may be re-synchronized to the beacon signals with the help of the time period or timer. The first signal may include a buffered data indication (for instance in More Data field). When the STA identifies there is no buffered frame for itself (e.g. More Data field is 0), it may go to sleep. If the low power STA identifies there is any buffered frame for itself (More Data field is 1), it may go to sleep but may wake up again upon expiry of the time period (i.e. the timer expires).

The AP may set the timer (Duration field) as the duration to the next TBTT in a first signal. In other words, the time period may be at time duration to the transmission time by which the AP must transmit the next beacon signal. The first signal may be a NDP ACK frame. The AP may treat the non-TIM station (STA) as a TIM STA starting from the next TBTT. When the timer expires, STA may wake up to receive a second signal. The second signal may be a beacon signal. The station may operate as a TIM STA. The STA may return to the non-TIM STA operation mode if the AP indicates that there is no more data buffered for the STA and the STA indicates to the AP that there is no more data to transmit. The AP may treat the STA as a non-TIM STA if the STA indicates that there is no more data to transmit and the AP indicates that there is no more data buffered for the STA. The AP may set the timer to o. If AP sets the timer to 0, it indicates that there is no sleep duration for the low power STA.

A beacon signal may also include RAW slot information. A beacon signal may include RAW slot information associated with a TIM bit for a station. The station receiving the beacon signal may follow RAW operation and may not transmit a polling signal. The station may be deactivated until a time at the start or within the assigned RAW slot. The station may be activated at a time at the start or within the assigned RAW slot. The station may be activated to receive a data signal.

Figure 9:
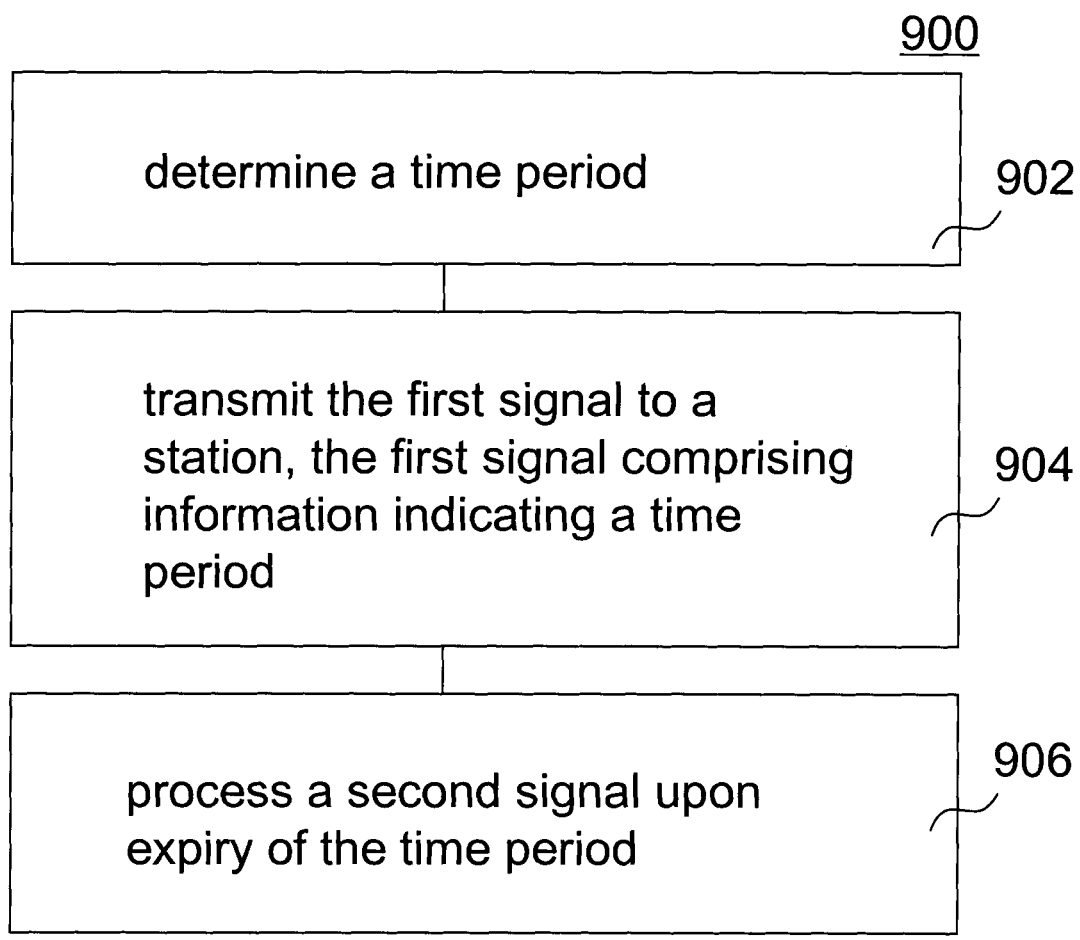
FIG. 9 is a schematic showing a method of controlling an access point according to various embodiments.

FIG. 9 is a schematic 900 showing a method of controlling an access point according to various embodiments. The method may provide, in 902, determining a time period. The method may further include, in 904, transmitting a first signal to a station, the first signal including information indicating a time period. The method may further provide, in 906, processing a second signal upon expiry of the time period.

In other words, the access point may transmit a first signal to a station. The first signal may indicate a time period. The time period may be determined by the access point. The station may be required to be in an awake mode at the end of the time period. The access point may either transmit a further signal to the station or receive a further signal from the station at the end of the time period.

In various embodiments, processing the second signal includes transmitting the second signal to the station.

The second signal may be one signal of a prescheduled series of signals. The second signal may be one signal of a prescheduled series of periodic signals. The second signal may be one beacon signal of a prescheduled series of periodic beacon series. In other words, the time interval between consecutive beacon signals may be equal.

The time period may be indicated by a duration between transmitting of the first signal from the access point and transmitting of the second signal from the access point. The time period may alternatively be indicated by a duration between transmitting of the first signal from the access point to a predetermined time such as a time at the start or within an Open Access Window.

In various embodiments, the second signal may include an indication for the station to be awake to receive a data signal. Receiving the data signal may include processing the data signal.

In various embodiments, the second signal may include an indication on whether there is buffered data stored in the access point for the station.

The second signal may include a Traffic Indication Map (TIM) or a Traffic Indication Map (TIM) segment. An indication on whether there is buffered data stored in the access point for the station may include a TIM bit for the station.

The second signal may include buffered data. In other words, the second signal may be a data signal. The buffered data may be stored in the access point for the station.

The second signal may include an indication for the station to transmit a subsequent polling signal to the access point.

The second signal may be a beacon signal or an authentication request signal or a probe response signal.

The method may further include receiving the subsequent polling signal from the access point. The method may also include transmitting a data signal including buffered data to the station. Receiving the data signal may include processing the data signal.

In various embodiments, determining the time period may include determining based on number of stations in the vicinity of the access point. Determining may include determining based on current network traffic experienced by the access point or/and past average network traffic processed by the access point.

In various embodiments, the method may further include receiving a prior polling signal transmitted from the station. The prior polling signal may include a trigger signal or a trigger frame such as DATA NULL, QoS (Quality of Service) NULL. The prior polling signal may be a probe request signal. The prior polling signal may also include a prior PS-Poll signal or a prior PS-Poll frame or a prior NDP PS-Poll frame. A PS-Poll signal or a PS-Poll frame may be used by a STA to query an AP whether there is buffered frame for the STA. A trigger frame may be used by a STA to inform an AP that the STA has some information to transmit to the AP.

In various embodiments, the method may further include determining whether to transmit the first signal.

The first signal may include an indication whether there is buffered data stored in the AP for the station. When the first signal includes the indication that there is buffered data stored in the AP for the station the first signal may also include information indicating the time period. Alternatively, when the first signal includes the indication that there is no buffered data stored in the AP for the station, the first signal may not include information indicating the time period. The first signal may be a NDP ACK signal or a NDP ACK frame including information indicating a time period. The first signal may be a beacon signal including information indicating a time period. The first signal may be an ACK signal or an ACK frame including information indicating a time period. The first signal may be a probe response signal.

A beacon signal may also include RAW slot information. A beacon signal may include RAW slot information associated with a TIM bit for a station. The station receiving the beacon signal may follow RAW operation and may not transmit a polling signal. The station may be deactivated until a time at the start or within the assigned RAW slot. The station may be activated at a time at the start or within the assigned RAW slot. The station may be activated to receive a data signal.

Figure 10:
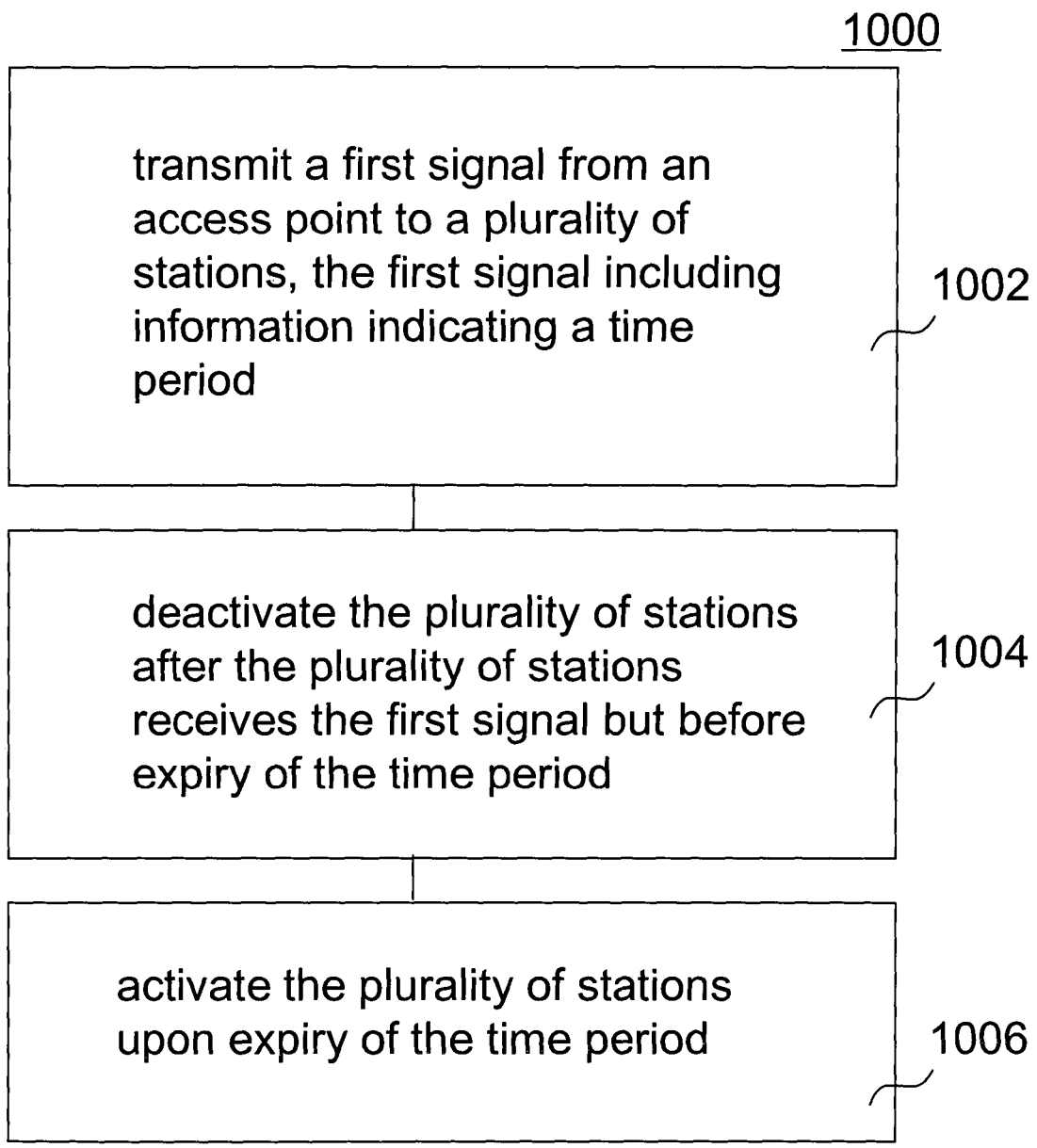
FIG. 10 is a schematic showing a method of communication between an access point and a plurality of stations according to various embodiments.

FIG. 10 is a schematic 1000 showing a method of communication between an access point and a plurality of stations according to various embodiments.

The method may provide, in 1002, transmitting a first signal from an access point to a plurality of stations, the first signal including information indicating a time period. The method may further provide, in 1004, deactivating the plurality of stations after the plurality of stations receives the first signal but before expiry of the time period. The method may also provide, in 1006, activating the plurality of stations upon expiry of the time period.

In other words, the method may include a first signal from an access point to a plurality of stations. The first signal may indicate a time period. The plurality of stations may be required to be in an awake mode at the end of the time period. The plurality of stations may go to an asleep mode after receiving the first signal and switch to the awake mode by the end of the time period.

The plurality of stations may be activated upon expiry of the time period to receive a second signal from the access point. In various embodiments, one or more of the plurality of stations may be activated upon expiry of the time period to receive a second signal from the access point. Receiving a signal may include processing the signal.

The second signal may be one signal of a prescheduled series of signals. The second signal may be one signal of a prescheduled series of periodic signals. The second signal may be one beacon signal of a prescheduled series of periodic beacon series. In other words, the time interval between consecutive beacon signals may be equal.

The time period may be indicated by a duration between transmitting of the first signal from the access point and transmitting of the second signal from the access point. The time period may alternatively be indicated by a duration between transmitting of the first signal from the access point to a predetermined time interval such as an Open Access Window.

In various embodiments, the second signal may include an indication for one or more stations of a plurality of stations to be awake to receive a data signal. Receiving the data signal may include processing the data signal.

In various embodiments, the second signal may include an indication on whether there is buffered data stored in the access point for each station of the plurality of stations.

The second signal may include a Traffic Indication Map (TIM) or a Traffic Indication Map (TIM) segment.

The second signal may include buffered data. In other words, the second signal may be a data signal. The buffered data may be stored in the access point for one or more stations of the plurality of stations.

The second signal may include an indication of one or more stations of the plurality of stations to transmit a subsequent polling signal to the access point.

The second signal may be a beacon signal or an authentication request signal or a probe response signal.

In various embodiments, the method may further include transmitting a prior polling signal from one or more stations of the plurality of stations to the access point.

The method may further include grouping one or more stations (STAB) to form the plurality of stations. The plurality of stations may have about the same listening interval. The method may include transmitting the first signal from the AP to the plurality of stations. The first signal may not include the relevant TIM segment for the plurality of stations. The first signal may include information indicating a time period. The expiry of the time period may be a time by which the AP will transmit a second signal. The second signal may include the relevant TIM segment for the plurality of stations.

Figure 11:
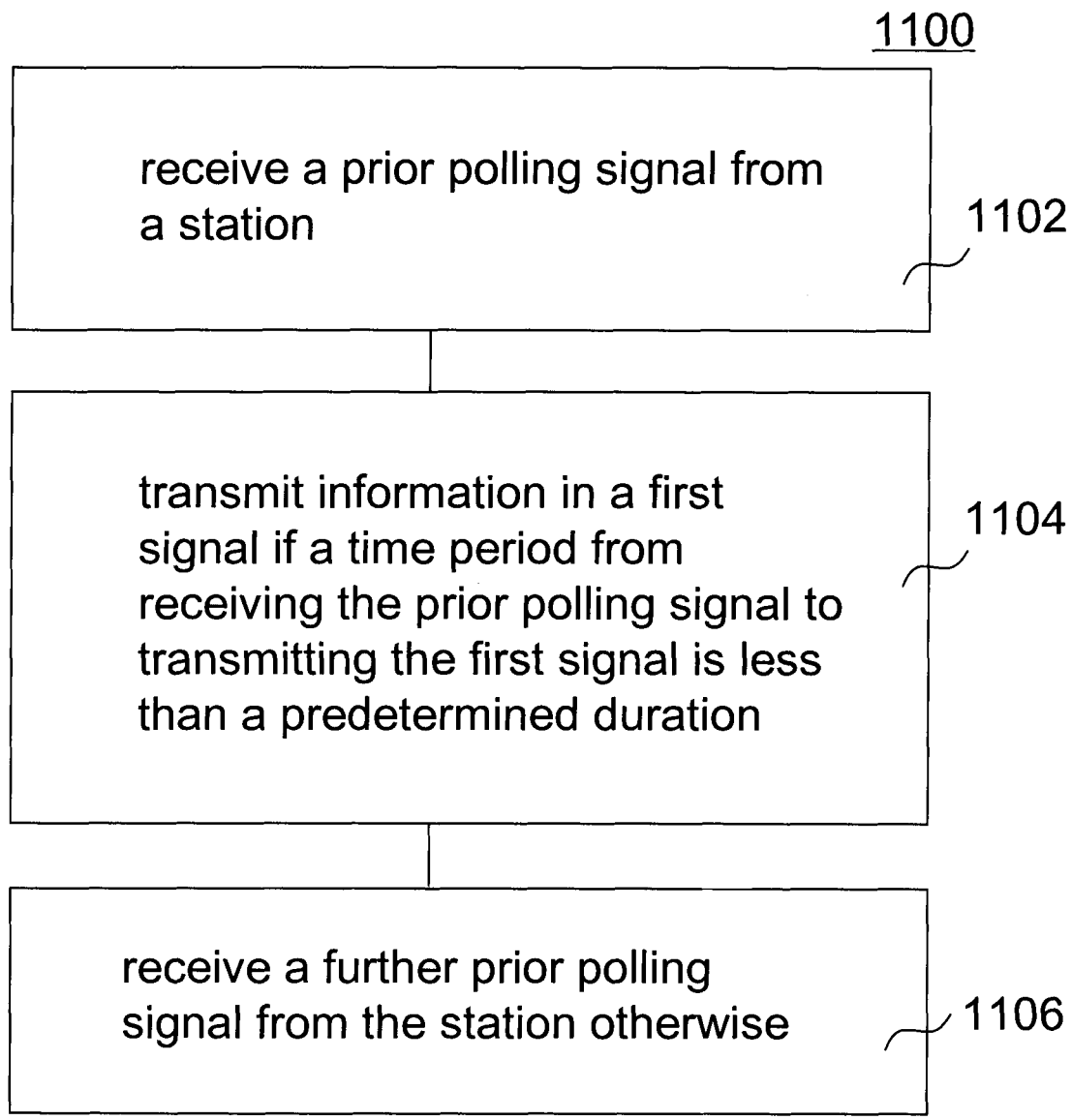
FIG. 11 is a schematic showing a method of controlling an access point according to various embodiments.

FIG. 11 is a schematic 1100 showing a method of controlling an access point according to various embodiments. The method may include, in 1102, receiving a prior polling signal from a station. The method may further include, in 1104, transmitting information in a first signal if a time period from receiving the prior polling signal to transmitting the first signal is less than a predetermined duration. The method may further include, in 1106, receiving a further prior polling signal from the station otherwise.

In other words, the method may include receiving a prior polling signal from a station. The access point may transmit a first signal within a predetermined duration. If the access point is unable to transmit the first signal within the predetermined duration, the access point may wait for the station to transmit a further prior polling signal.

The first signal may be one signal of a prescheduled series of signals. The first signal may be one signal of a prescheduled series of periodic signals.

In various embodiments, the first signal may include information indicating a time period. A station receiving the first signal may deactivate after receiving the first signal and before expiry of the time period. The station may be activated upon expiry of the time period. Alternatively, the first signal may not include the time period.

The first signal may include an indication whether there is buffered data stored in the AP for the station. When the first signal includes the indication that there is buffered data stored in the AP for the station the first signal may also include information indicating the time period. Alternatively, when the first signal includes the indication that there is no buffered data stored in the AP for the station, the first signal may not include information indicating the time period.

The first signal may include a TIM or a TIM segment.

Figure 12:
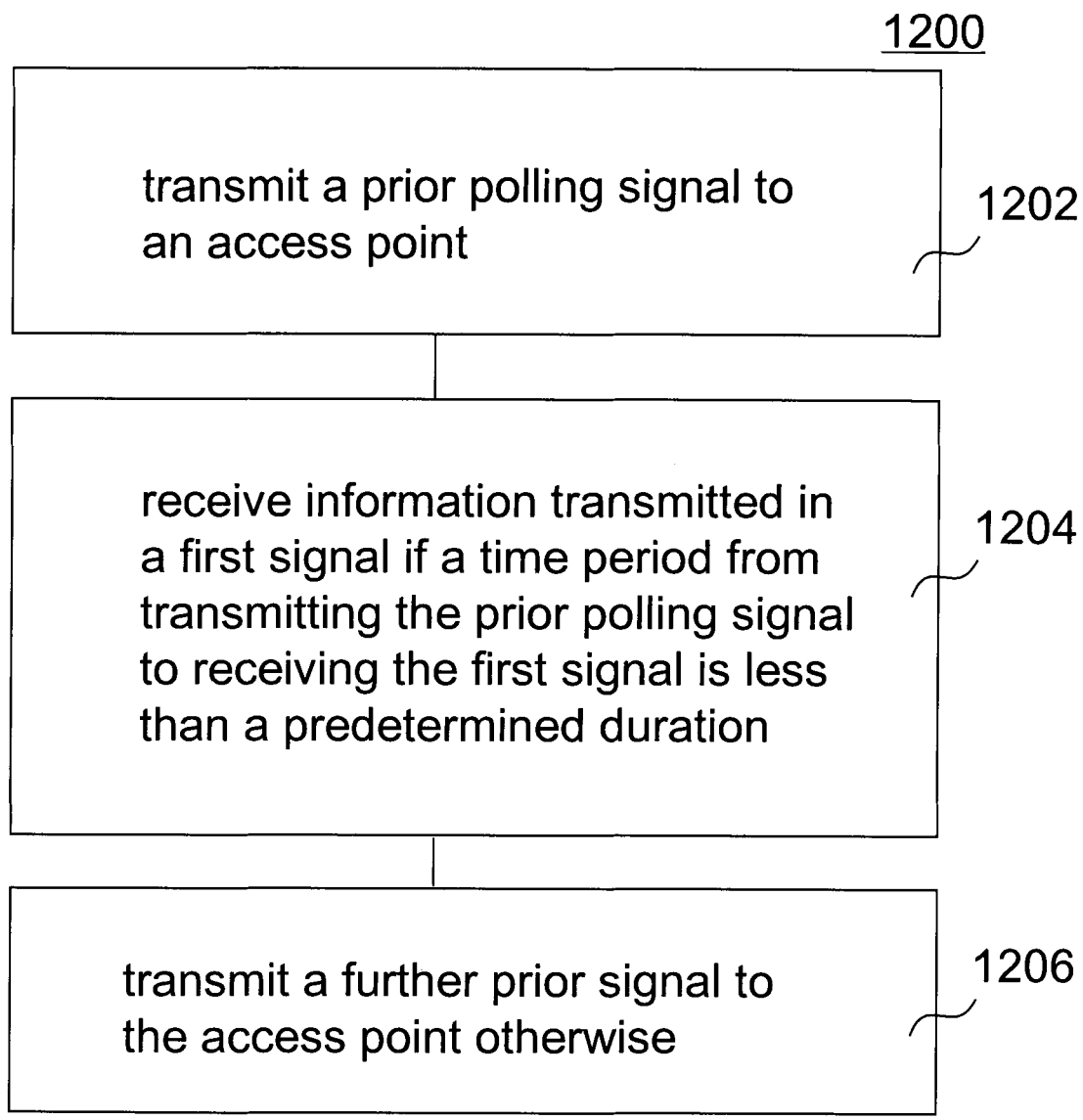
FIG. 12 is a schematic showing a method of controlling a station according to various embodiments.

FIG. 12 is a schematic 1200 showing a method of controlling a station according to various embodiments. The method includes, in 1202, transmitting a prior polling signal to an access point. The method may further include, in 1204, receiving information transmitted in a first signal if a time period from transmitting the prior polling signal to receiving the first signal is less than a predetermined duration. The method further includes, in 1206, transmitting a further prior signal to the access point otherwise.

In other words, the method may include transmitting a prior polling signal to an access point. The station may receive a first signal within a predetermined duration from transmitting of the prior polling signal. If the station does not receive the first signal within the predetermined duration from the transmitting of the prior polling signal, the station may transmit a further prior polling signal to the access point.

The first signal may be one signal of a prescheduled series of signals. The first signal may be one signal of a prescheduled series of periodic signals.

The predetermined duration may be based on the number of polling signals received by the AP. The predetermined duration may be based on an average delay from transmitting a signal and receiving a response signal in response to the signal by all stations within a vicinity of the AP. The predetermined duration may be agreed by the station and the AP during authentication/association procedures or other procedures or other management frame transmissions between the station and the AP.

Transmitting the further prior signal to the access point includes deactivating the station and activating the station to transmit the further prior polling signal to the access point.

The method may further include receiving information transmitted in a first signal if a time period from transmitting the further prior polling signal to receiving the first signal is less than a predetermined duration. Otherwise, subsequent prior polling signals may be transmitted from the stations until a first signal is received by the AP.

The first signal may include a TIM or a TIM segment.

Figure 13:
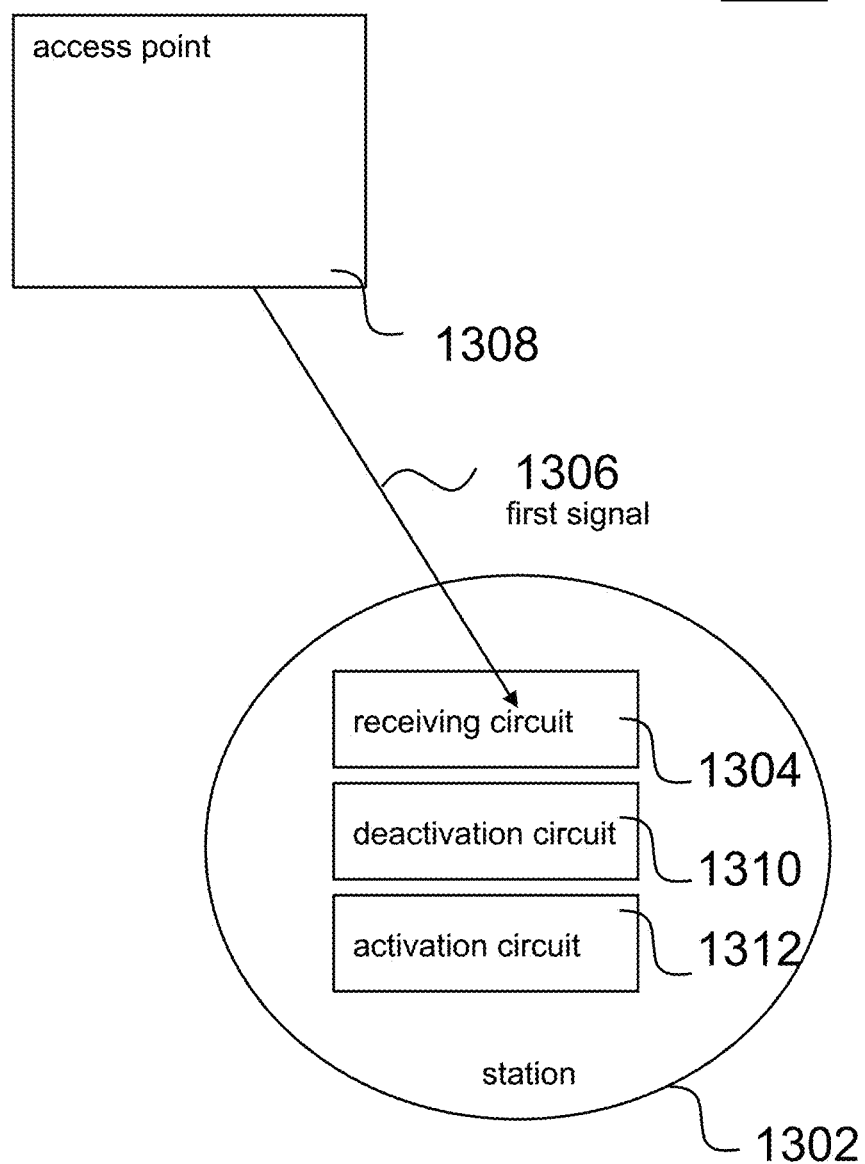
FIG. 13 shows a schematic of a station according to various embodiments.

FIG. 13 shows a schematic 1300 of a station 1302 according to various embodiments. The station 1302 may include a receiving circuit 1304 configured to receive a first signal 1306 from an access point 1308, the first signal 1306 including information indicating a time period. The station may further include a deactivation circuit 1310 configured to receive deactivate the station 1302 after receiving the first signal and before expiry of the time period. The station may also include an activation circuit 1312 configured to activate the station 1302 upon expiry of the time period.

In other words, the station may include a receiving circuit configured to receive a first signal transmitted by an access point. The first signal may indicate a time period. The station may be required to be in an awake mode at the end of the time period. The station may further include a deactivation circuit for putting the station in an asleep mode and an activation circuit for putting the station into an awake mode.

The station 1302 may further include a timing circuit configured to track the time period.

In various embodiments, the deactivation circuit 1310 and the activation circuit 1312 may be the same circuit or include portions which overlap with each other.

The station 1302 may further include a transmitting circuit. The transmitting circuit may be configured to transmit a polling signal such as a prior polling signal or a subsequent polling signal.

In various embodiments, the activation circuit 1312 is configured to activate the station 1302 upon expiry of the time period to receive a second signal from the access point 1308.

The second signal may be one signal of a prescheduled series of signals. The second signal may be one signal of a prescheduled series of periodic signals. The second signal may be one beacon signal of a prescheduled series of periodic beacon series. In other words, the time interval between consecutive beacon signals may be equal.

The time period may be indicated by a duration between transmitting of the first signal 1306 from the access point 1308 and transmitting of the second signal from the access point 1308. The time period may alternatively be indicated by a duration between transmitting of the first signal 1306 from the access point 1308 to a predetermined time interval such as an Open Access Window.

In various embodiments, the second signal may include an indication for the station to be awake to receive a data signal.

In various embodiments, the second signal may include an indication on whether there is buffered data stored in the access point for the station.

The second signal may include a Traffic Indication Map (TIM) or a Traffic Indication Map (TIM) segment.

The second signal may include buffered data. In other words, the second signal may be a data signal. The buffered data may be stored in the access point for the station.

The second signal may include an indication for the station to transmit a subsequent polling signal to the access point.

In various embodiments, the transmitting circuit may be configured to transmit the second signal to the access point 1308.

The time period may be determined by the access point 1308. In various embodiments, the time period may be determined by the number of stations in the vicinity of the access point 1308, or current network traffic experienced by the access point 1308 or past average network traffic processed by the access point 1308.

The first signal 1306 may include an indication whether there is buffered data stored in the AP 1306 for the station 1302. When the first signal 1306 includes the indication that there is buffered data stored in the AP 1306 for the station 1302, the first signal 1306 may also include information indicating the time period. Alternatively, when the first signal 1306 includes the indication that there is no buffered data stored in the AP 1306 for the station 1302, the first signal 1306 may not include information indicating the time period.

Figure 14:
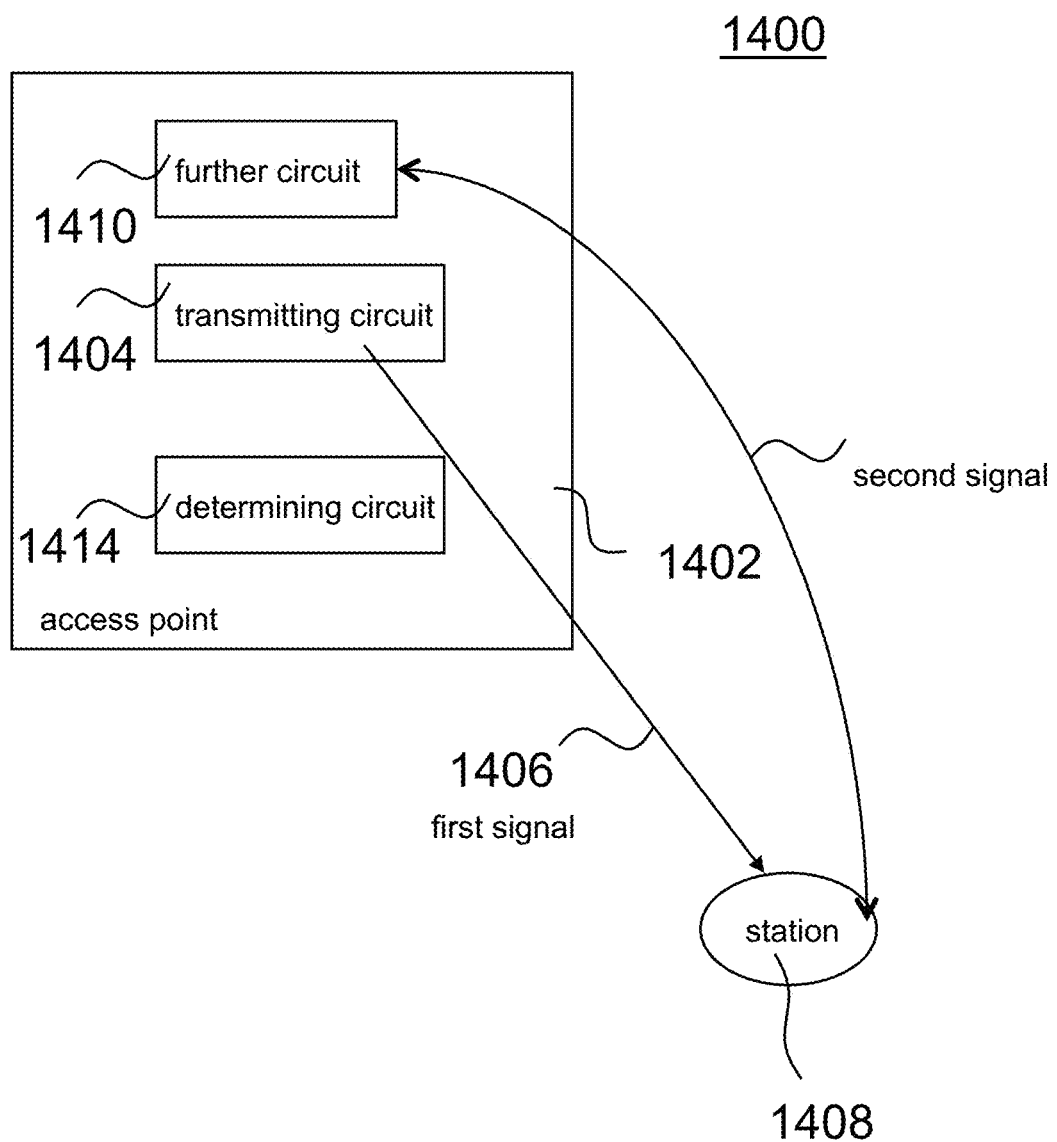
FIG. 14 shows a schematic of an access point according to various embodiments.

FIG. 14 shows a schematic 1400 of an access point 1402 according to various embodiments. The access point 1402 may include a transmitting circuit 1404 configured to transmit a first signal 1406 to a station 1408, the first signal 1406 including information indicating a time period. The access point 1402 may further include a further circuit 1410 configured to process a second signal 1412 upon expiry of the time period. The access point 1402 may further include a determining circuit 1414 to determine the time period.

In other words, the access point may include a transmitting circuit configured to transmit a first signal to a station. The first signal may indicate a time period. The station may be required to be in an awake mode at the end of the time period. The access point may further include a further circuit to either receive from the station or transmit to the station a second signal. The station may also include a determining circuit to determine the time period.

The further circuit 1404 may be a further transmitting circuit. In various alternate embodiments, the further circuit 1404 may be a receiving circuit. The transmitting circuit 1404 and the further transmitting circuit may be the same circuit or may include a portion which overlaps with each other. In various embodiments, the transmitting circuit 1404 may be configured to transmit the first signal 1406 and/or the second signal.

The access point 1402 may further include a timing circuit configured to track the time period.

The second signal may be one signal of a prescheduled series of signals. The second signal may be one signal of a prescheduled series of periodic signals. The second signal may be one beacon signal of a prescheduled series of periodic beacon series. In other words, the time interval between consecutive beacon signals may be equal.

The time period may be indicated by a duration between transmitting of the first signal 1406 from the access point 1402 and transmitting of the second signal from the access point 1402. The time period may alternatively be indicated by a duration between transmitting of the first signal 1406 from the access point 1402 to a predetermined time such as a time at the start or within an Open Access Window.

In various embodiments, the second signal may include an indication for the station 1408 to be awake to receive a data signal.

In various embodiments, the second signal may include an indication on whether there is buffered data stored in the access point for the station 1408.

The second signal may include a Traffic Indication Map (TIM) or a Traffic Indication Map (TIM) segment.

The second signal may include buffered data. In other words, the second signal may be a data signal. The buffered data may be stored in the access point 1402 for the station.

The second signal may include an indication for the station 1408 to transmit a subsequent polling signal to the access point 1402.

The access point 1402 may further include a receiving circuit configured to receive a polling signal such as a prior polling signal or a subsequent polling signal.

In various embodiments, the access point 1402 may further include a determining circuit configured to determine the time period based on number of stations in the vicinity of the access point. Determination of the time period may be based on current network traffic experienced by the access point or/and past average network traffic processed by the access point. In various embodiments, the access point 1402 may further include determining circuit configured to determine whether to transmit the first signal.

The access point 1402 may further have a buffer or a memory or a hard disk or an information storage component or device configured to store buffered data.

Figure 15:
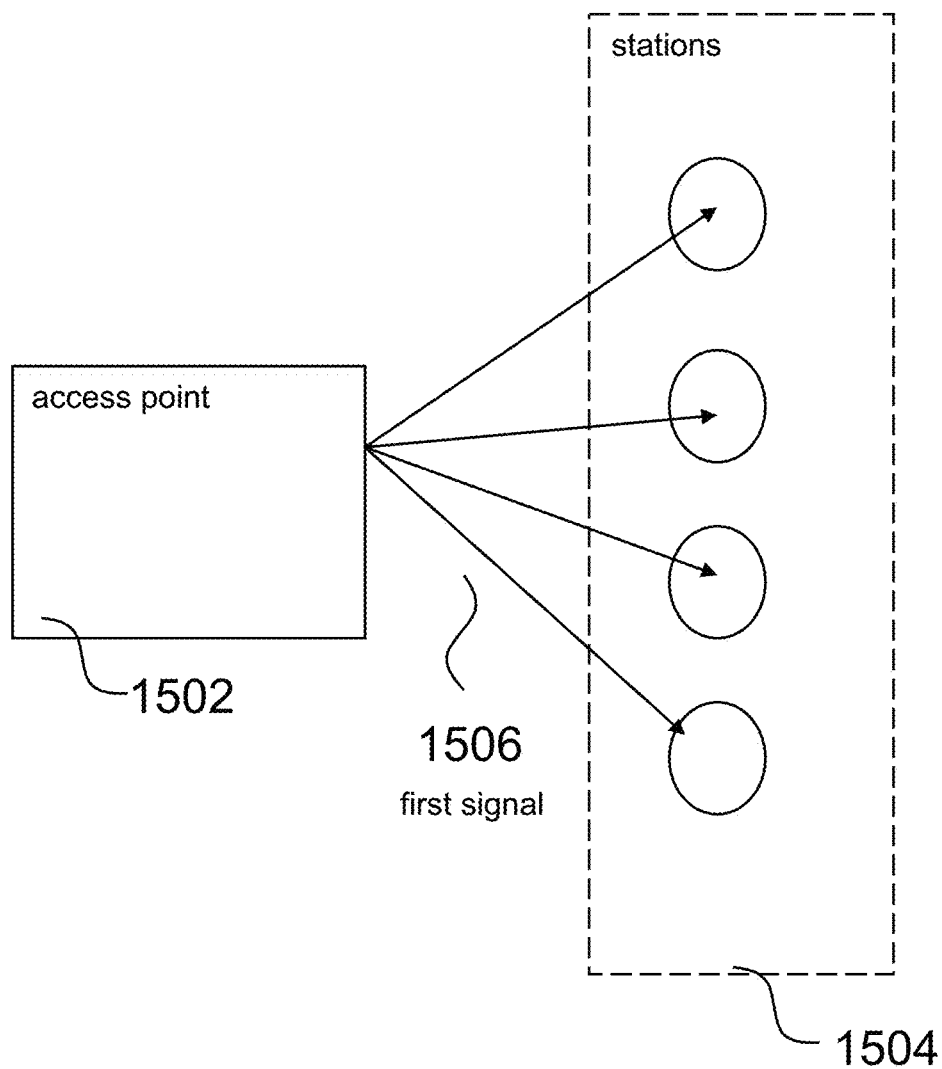
FIG. 15 shows a schematic a communication system according to various embodiments.

FIG. 15 shows a schematic 1500 a communication system according to various embodiments. The communication system may include an access point 1502 and a plurality of stations 1504. The access point 1502 may be configured to transmit a first signal 1506 to the plurality of stations 1504, the first signal 1506 including information indicating a time period. The plurality of stations 1504 may be configured to be deactivated after the plurality of stations 1504 receives the first signal 1506 but before expiry of the time period. The plurality of stations 1504 may be configured to be activated upon expiry of the time period.

In other words, the communication may include an access point and a plurality of stations. The access point may be configured to transmit a first signal to the plurality of stations. The first signal may indicate a time period. The plurality of stations may be required to be awake at the end of the time period. The plurality of stations may be configured to go into an asleep mode after receiving the first signal and before the end of the time period. The plurality of stations may be further configured to go into an awake mode by the end of the time period.

The access point 1502 may be configured to transmit a second signal. The second signal may include an indication of one or more stations of the plurality of stations 1504 to transmit a subsequent polling signal to the access point 1502. The access point 1502 may further include a processor configured to check whether there is buffered data stored in the access point 1502 for each station of the plurality of stations 1504. The processor may be further configured to generate the indication.

Figure 16:
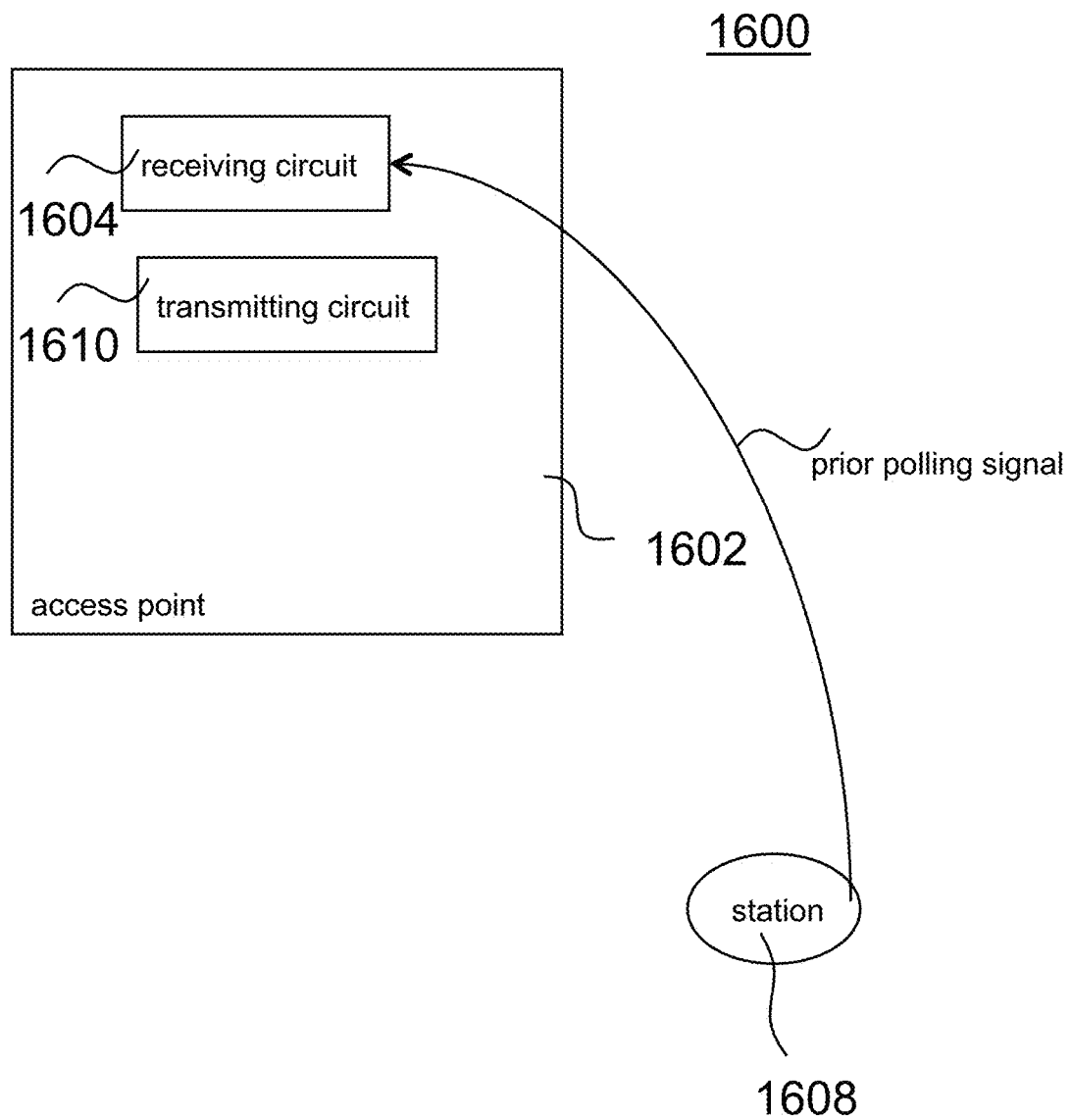
FIG. 16 shows a schematic of an access point according to various embodiments.

FIG. 16 shows a schematic 1600 of an access point 1602 according to various embodiments. The access point 1602 may include a receiving circuit 1604 configured to receive a prior polling signal 1606 from a station 1608. The access point may further include a transmitting circuit 1610 configured to transmit information in a first signal if a time period from receiving the prior polling signal to transmitting the first signal is less than a predetermined duration. The receiving circuit 1604 may be configured to receive a further polling signal from the station 1608 otherwise.

In other words, the access point may include a receiving circuit configured to receive a prior polling signal from a station. The access point may also include a transmitting circuit configured to transmit a first signal within a predetermined duration from the receiving circuit receiving the prior polling signal. If the transmitting circuit is unable to successfully transmit the first signal within the predetermined duration, the receiving circuit may be configured to receive a further polling signal from the station.

Figure 17:
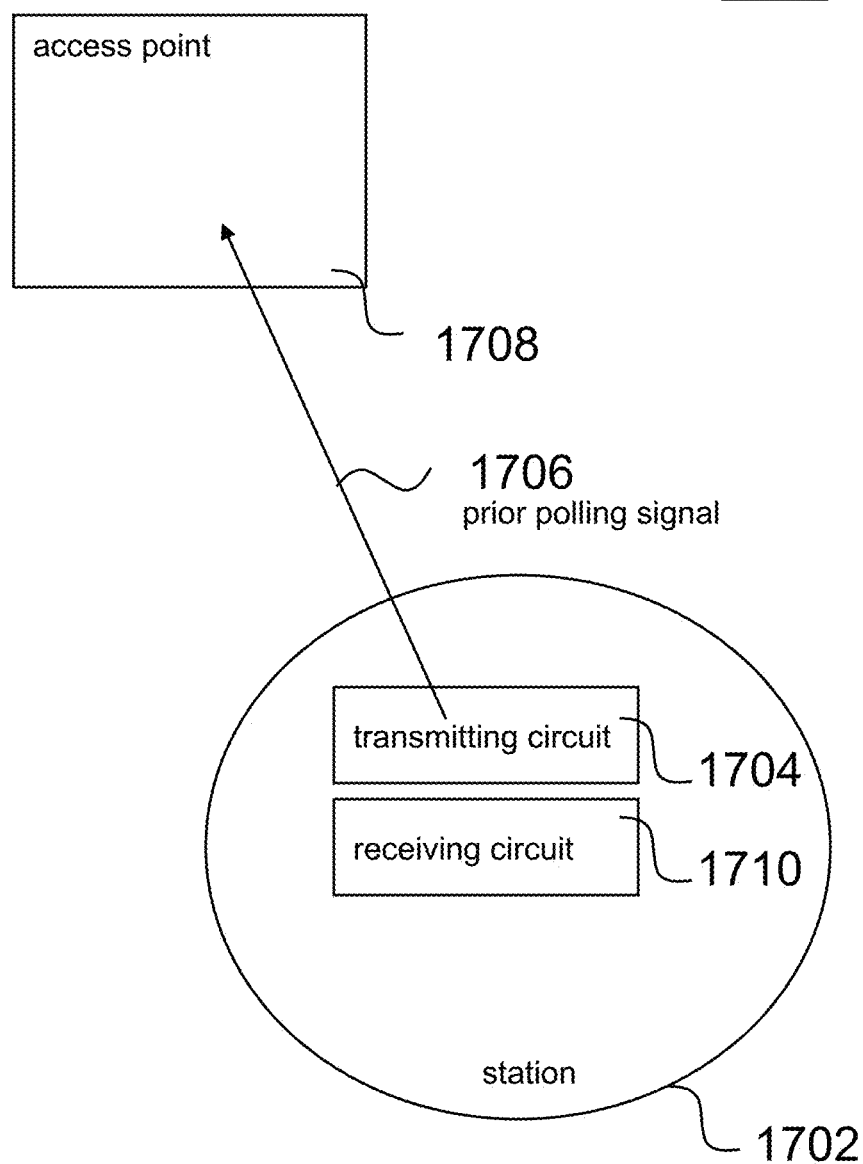
FIG. 17 shows a schematic of a station according to various embodiments.

FIG. 17 shows a schematic 1700 of a station 1702 according to various embodiments. The station 1702 may include a transmitting circuit 1704 configured to transmit a prior polling signal 1706 to an access point 1708. The station may further include a receiving circuit 1710 configured to receive information transmitted in a first signal if a time period from receiving by the access point the prior polling signal to transmitting by the access point the first signal is less than a predetermined duration. The transmitting circuit 1704 may be configured to transmit a further polling signal to the access point 1708 otherwise.

In other words, the station may include a transmitting circuit configured to transmit a prior polling signal to an access point. The station may further include a receiving circuit configured to receive a first signal within a predetermined duration from the transmitting circuit transmitting the prior polling signal. If the receiving circuit does not receive the first signal within the predetermined duration, the transmitting circuit may be configured to transmit a further polling signal to the access point.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of controlling a station, the method comprising:
   transmitting a polling signal to an access point;
   receiving a first signal from the access point in response to the polling signal, the first signal comprising information indicating a time period;
   deactivating the station after receiving the first signal and before expiry of the time period; and
   activating the station upon expiry of the time period.

2. The method according to claim 1,
   wherein the station is activated upon expiry of the time period to receive a second signal from the access point.

3. The method according to claim 2,
   wherein the second signal is one signal of a prescheduled series of periodic signals.

4. The method according to claim 2,
   wherein the time period is indicated by a duration between transmitting of the first signal from the access point and transmitting of the second signal from the access point.

5. The method according to claim 2,
   wherein the second signal comprises a traffic indication map.

6. The method according to claim 2,
   wherein the second signal comprises a traffic indication map segment.

7. The method according to claim 2,
   wherein the second signal comprises buffered data.

8. The method according to claim 2,
   wherein the second signal comprises an indication for the station to transmit a subsequent polling signal to the access point.

9. The method according to claim 8, the method further comprising:
   transmitting the subsequent polling signal to the access point; and
   receiving a data signal comprising buffered data from the access point.

10. The method according to claim 2,
    wherein the second signal comprises an indication for the station to be awake to receive a data signal.

11. The method according to claim 2,
    wherein the polling signal is a probe request signal, the first signal from the access point is a probe response signal, and the second signal comprises an indication for the station to transmit an authentication request signal to the access point.

12. The method according to claim 1,
    wherein the polling signal is a prior Powersave-Poll signal.

13. The method according to claim 1,
    wherein the polling signal is a trigger frame.

14. The method according to claim 1,
    wherein the station is activated upon expiry of the time period to transmit a second signal to the access point.

15. A method of controlling an access point, the method comprising:
receiving a polling signal from a station;
determining a time period;
transmitting a first signal to the station in response to the polling signal, the first signal comprising information indicating the time period; and
processing a second signal upon expiry of the time period.

16. The method according to claim 15,
wherein processing the second signal comprises transmitting the second signal.

17. A method of communication between an access point and a plurality of stations, the method comprising:
transmitting a polling signal from one or more stations of the plurality of stations to the access point;
transmitting a first signal from the access point to the plurality of stations in response to the polling signal, the first signal comprising information indicating a time period;
deactivating the plurality of stations after the plurality of stations receives the first signal but before expiry of the time period; and
activating the plurality of stations upon expiry of the time period.

18. The method according to claim 17,
wherein the plurality of stations is activated upon expiry of the time period to receive a second signal from the access point.

19. The method of communication according to claim 18,
wherein the second signal comprises an indication for one or more stations of the plurality of stations to transmit a subsequent polling signal to the access point.

20. A station comprising:
a transmitting circuit configured to transmit a polling signal to an access point;
a receiving circuit configured to receive a first signal from the access point in response to the polling signal, the first signal comprising information indicating a time period;
a deactivation circuit configured to deactivate the station after receiving the first signal and before expiry of the time period; and
an activation circuit configured to activate the station upon expiry of the time period.

21. An access point comprising:
a receiving circuit configured to receive a polling signal from a station;
a transmitting circuit configured to transmit a first signal to the station in response to the polling signal, the first signal comprising information indicating a time period; and
a further circuit configured to process a second signal upon expiry of the time period.

22. A communication system comprising:
an access point; and
a plurality of stations;
wherein one or more stations of the plurality of stations are configured to transmit a polling signal to the access point;
wherein the access point is configured to transmit a first signal to the plurality of stations in response to the polling signal, the first signal comprising information indicating a time period;
wherein the plurality of stations is configured to be deactivated after the plurality of stations receives the first signal but before expiry of the time period; and
wherein the plurality of stations is configured to be activated upon expiry of the time period.

* * * * *